United States Patent [19]

Lehmann

[11] Patent Number: 5,114,430
[45] Date of Patent: May 19, 1992

[54] PROCESS FOR TRICHROMATIC DYEING OR PRINTING OF NATURAL AND SYNTHETIC POLYAMIDE MATERIAL WITH FIBRE-REACTIVE FORMAZAN DYES AND FIBRE-REACTIVE AZO DYES

[75] Inventor: Urs Lehmann, Basel, Switzerland

[73] Assignee: Ciba-Geigy Corporation, Ardsley, N.Y.

[21] Appl. No.: 612,754

[22] Filed: Nov. 13, 1990

Related U.S. Application Data

[62] Division of Ser. No. 374,320, Jun. 29, 1989, Pat. No. 4,994,562.

[30] Foreign Application Priority Data

Jun. 29, 1988 [CH] Switzerland ............ 2473/88

[51] Int. Cl.⁵ .......... C09B 62/46; D21H 21/28; D06P 1/38
[52] U.S. Cl. .............................. 8/549; 8/436; 8/437; 8/543; 8/638; 8/639; 8/641; 8/917; 8/919; 8/924; 534/618
[58] Field of Search ............ 8/641, 549, 638

[56] References Cited

U.S. PATENT DOCUMENTS

| | | | |
|---|---|---|---|
| 3,926,942 | 12/1975 | Yelland | 534/618 |
| 4,444,564 | 4/1984 | Salathe et al. | 8/588 |
| 4,563,192 | 1/1986 | Salathe et al. | 8/554 |
| 4,801,694 | 1/1989 | Scheibli et al. | 534/637 |
| 4,994,562 | 2/1991 | Lehmann | 534/618 |

Primary Examiner—A. Lionel Clingman
Attorney, Agent, or Firm—Marla J. Mathias; Edward McC. Roberts

[57] ABSTRACT

The fibre-reactive formazan dyes of the formula

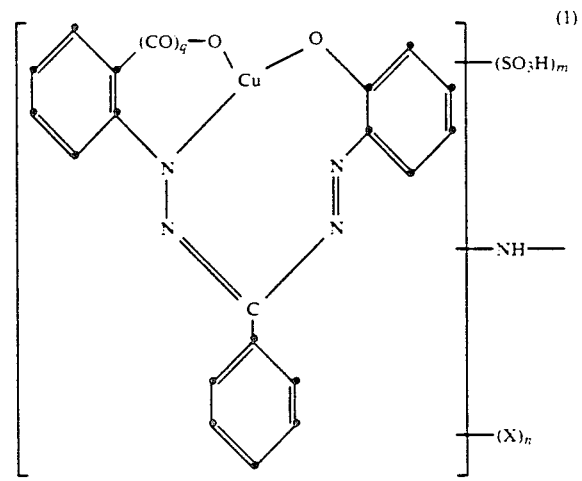

where B is an aliphatic or sulfo-free aromatic bridge member, R is $\alpha,\beta$-dihalopropionyl, $\alpha$-haloacryloyl or haloacetyl, $T_1$ is halogen, X is halogen, $C_1$-$C_4$alkyl, $C_1$-$C_4$alkoxy, cyano or nitro, Y is —CO— or —SO$_2$—, Z is nitrogen or —C—$T_2$, $T_2$ is halogen, hydrogen, $C_1$-$C_4$alkylthio, cyano, formyl or $C_1$-$C_4$alkylsulfonyl, m is 1, 2 or 3, n is 0, 1 or 2, q is 0 or 1, and r and s are each either 0 or 1 but never the same as each other, produce dyeings having good fastness properties on nitrogen-containing or hydroxyl-containing fibre materials.

7 Claims, No Drawings

PROCESS FOR TRICHROMATIC DYEING OR PRINTING OF NATURAL AND SYNTHETIC POLYAMIDE MATERIAL WITH FIBRE-REACTIVE FORMAZAN DYES AND FIBRE-REACTIVE AZO DYES

This is a divisional of application Ser. No. 374,320 filed on Jun. 29, 1989, now U.S. Pat. No. 4,994,562 issued Feb. 19, 1991.

The present invention relates to novel fibre-reactive formazan dyes, to processes for preparing them and to the use of these dyes for dyeing and printing fibre materials.

The present invention provides fibre-reactive formazan dyes of the formula

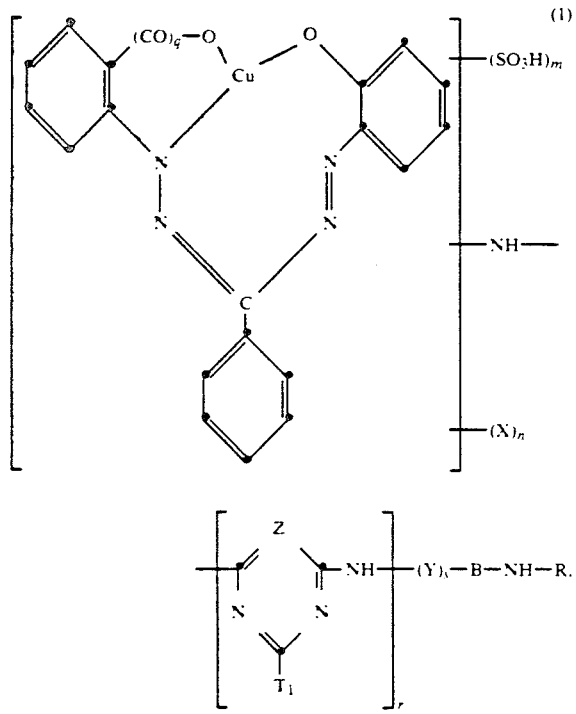

where B is an aliphatic or sulfo-free aromatic bridge member, R is $\alpha,\beta$-dihalopropionyl, $\alpha$-haloacryloyl or haloacetyl, $T_1$ is halogen, X is halogen, $C_1$-$C_4$alkyl, $C_1$-$C_4$alkoxy, cyano or nitro, Y is —CO— or —SO$_2$—, Z is nitrogen or —C—$T_2$, $T_2$ is halogen, hydrogen, $C_1$-$C_4$alkylthio, cyano, formyl or $C_1$-$C_4$alkylsulfonyl, m is 1, 2 or 3, n is 0, 1 or 2, q is 0 or 1, and r and s are each either 0 or 1 but never the same as each other.

An aliphatic bridge member B in the formula (1) is $C_1$-$C_8$alkylene, in particular $C_1$-$C_6$alkylene, which may be substituted in the alkylene, for example by halogen, such as fluorine, chlorine or bromine, or by $C_1$-$C_4$-alkoxy, such as methoxy or ethoxy.

An aromatic bridge member B in the formula (1) is naphthylene or in particular phenylene. Examples of substituents for naphthylene and phenylene are:

alkyl groups of 1 to 8, preferably 1 to 4, carbon atoms, e.g. methyl, ethyl, propyl, isopropyl, butyl, isobutyl, sec-butyl, tert-butyl, hexyl or octyl, alkoxy groups of 1 to 8 carbon atoms, in particular 1 to 4 carbon atoms, e.g. methoxy, ethoxy, propoxy, isopropoxy or butoxy, acylamino groups such as alkanoylamino groups of 2 to 8 carbon atoms and alkoxycarbonylamino groups of 2 to 8 carbon atoms e.g. acetylamino, propionylamino, methoxycarbonylamino, ethoxycarbonylamino or benzoylamino, $C_5$-$C_7$cycloalkylcarbonyl, benzoyl, amino, mono- or dialkylamino of 1 to 8 carbon atoms in the alkyl radical, phenylamino, alkoxycarbonyl of 1 to 8 carbon atoms in the alkoxy radical, $C_5$-$C_7$cycloalkylaminosulfonyl, nitro, cyano, trifluoromethyl, halogen, such as fluorine, bromine or in particular chlorine, sulfamoyl, sulfamoyl which is monosubstituted or disubstituted on the nitrogen atom by $C_1$-$C_4$alkyl, $C_5$-$C_7$cycloalkyl or phenyl, carbamoyl, ureido, hydroxyl, $C_1$-$C_8$alkylsulfonyl, $C_1$-$C_8$alkylaminosulfonyl, unsubstituted or $C_1$-$C_4$alkyl-substituted phenylsulfonyl, carboxyl, sulfomethyl, sulfato or thiosulfato, and also phenyl, naphthyl, phenoxy, phenoxysulfonyl and phenylaminosulfonyl, which phenyl or naphthyl radicals may be further substituted by the abovementioned substituents.

An $\alpha,\beta$-dihalopropionyl R in the formula (1) is for example $\alpha,\beta$-dibromopropionyl, $\alpha,\beta$-dichloropropionyl, $\alpha$-chloro-$\beta$-bromopropionyl or $\alpha$-bromo-$\beta$-chloropropionyl.

An $\alpha$-haloacryloyl R in the formula (1) is for example $\alpha$-bromoacryloyl or $\alpha$-chloroacryloyl.

A haloacetyl R in the formula (1) is bromoacetyl or chloroacetyl.

Halogen $T_1$ in the formula (1) is for example fluorine or in particular chlorine.

Halogen $T_2$ in the formula (1) is for example fluorine or in particular chlorine.

A $C_1$-$C_4$alkylthio $T_2$ in the formula (1) is for example methylthio, ethylthio, propylthio, isopropylthio, butylthio, isobutylthio, sec-butylthio or tert-butylthio.

A $C_1$-$C_4$alkylsulfonyl $T_2$ is for example methylsulfonyl, ethylsulfonyl or isopropylsulfonyl.

Halogen X in the formula (1) is for example fluorine or bromine or in particular chlorine.

A $C_1$-$C_4$alkyl X in the formula (1) is for example methyl, ethyl, propyl, isopropyl, butyl, isobutyl, sec-butyl or in particular tert-butyl.

A $C_1$-$C_4$alkoxy X in the formula (1) is for example methoxy, ethoxy, propoxy, isopropoxy, butoxy, isobutoxy, sec-butoxy or tert-butoxy.

Preference is given to dyes of the formula (1) where m is 2. Preference is further given to dyes of the formula (1) where q is 1.

Preference is likewise given to dyes of the formula (1) where X is halogen, in particular chlorine; particular preference is given to dyes of the formula (1) where m is 2, q is 1 and X is chlorine.

Preference is further given to dyes of the formula (1) where B is —(CH$_2$)$_p$— or

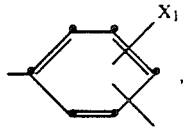

p is 1, 2, 3, 4, 5 or 6, and $X_1$ is hydrogen or a substituent other than sulfo; more particularly, B is as defined above, m is 2, q is 1 and X is chlorine. The substituent $X_1$ can have the same meanings as the abovementioned substituents on a phenylene B.

Preferably, n in the formula (1) is 0 or 1, in particular together with the abovementioned preferred meanings of m, q, X and/or B.

Preferably, $T_1$ in the formula (1) is fluorine or in particular chlorine and Z is —C—F or —C—Cl or in particular nitrogen; in particular, $T_1$ and Z have the abovementioned meanings together with the abovementioned preferred meanings of m, n, q, X and/or B.

Particular preference is given to the dyes of the formula is bromine and/or chlorine, $T_1$ is fluorine or in particular chlorine, X is chlorine, Y is —CO— or —SO$_2$—, n is 0 or 1, r is 0 or 1 and s is 0 or 1.

Very particular preference is given to the dyes of the formula

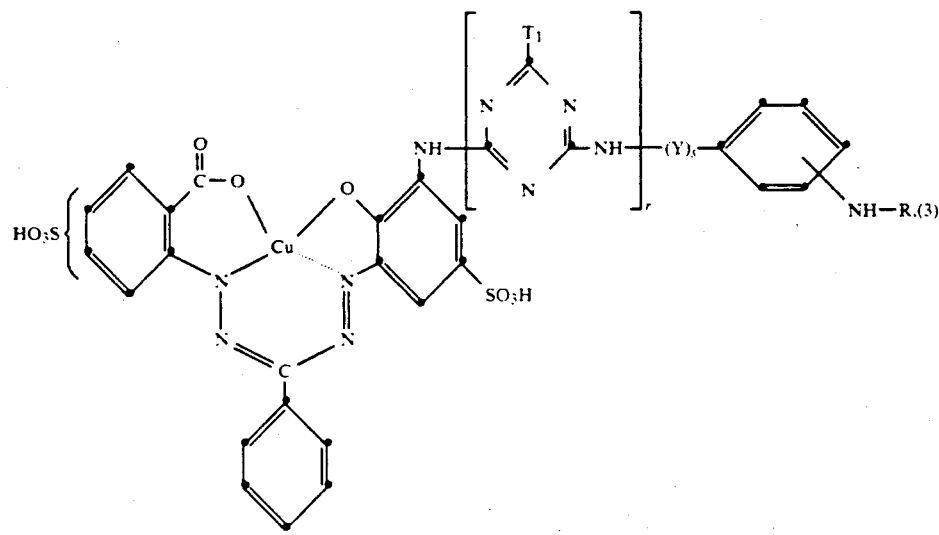

(3)

where R, $T_1$, Y, r and s are as defined under the formula (2).

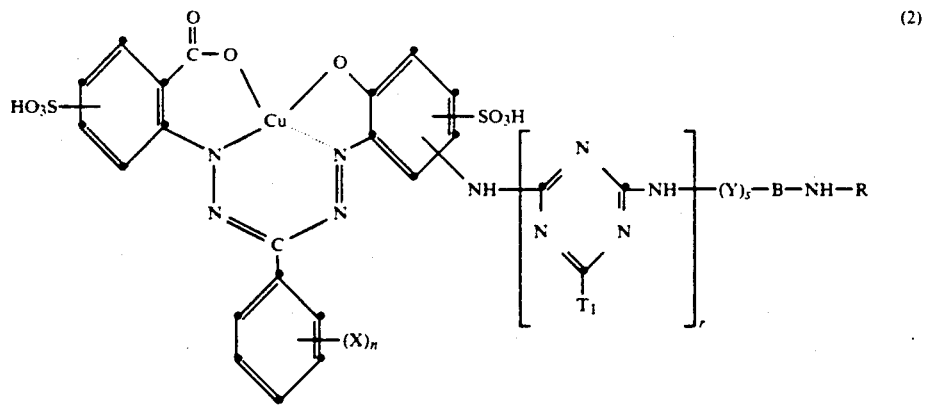

(2)

where B is phenylene, R is an α,β-dihalopropionyl, α-haloacryloyl or haloacetyl radical where the halogen Of the very particularly preferred dyes of the formula (3), the dyes of the formulae

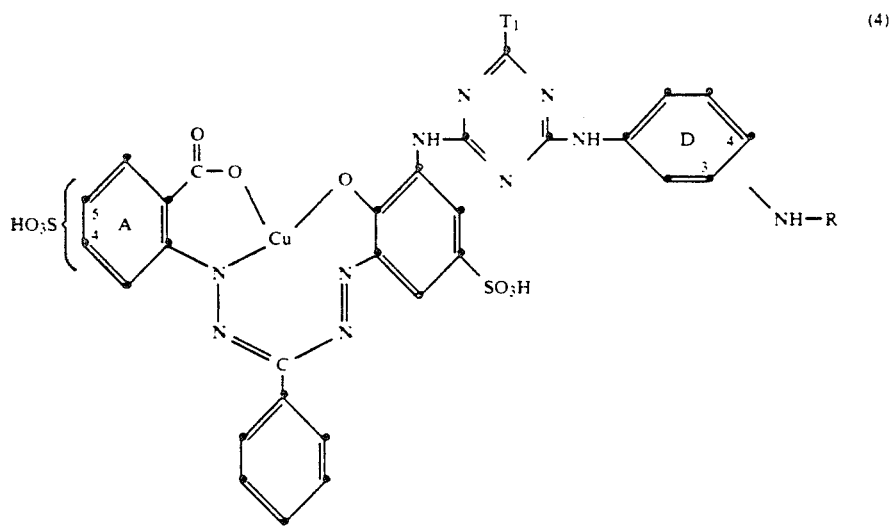

(4)

and

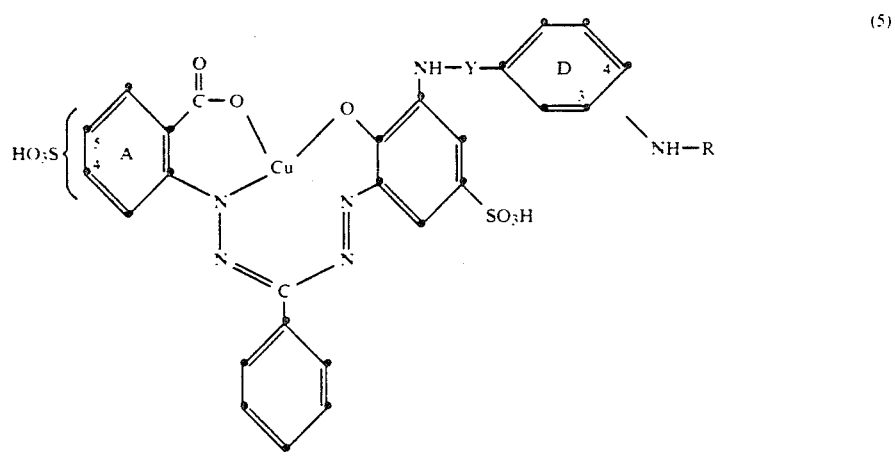

(5)

where in the formulae (4) and (5) R is α,β-dibromopropionyl, α-bromoacryloyl or chloroacetyl, the sulfo group is bonded to the benzo ring A in the 4- or 5-position, —NH—R is bonded to the benzo ring D in the 3- or 4-position, $T_1$ in the formula (4) is fluorine and in particular chlorine, and Y in the formula (5) is —CO— or —SO$_2$—, are very particularly important.

The present invention further provides a process for preparing the dyes of the formula (1), which comprises reacting a compound of the formula

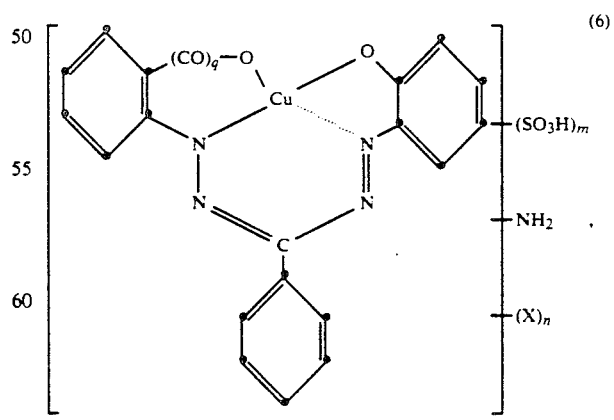

(6)

where X, m, n and q are as defined under the formula (1), with a compound which introduces the radical of the formula

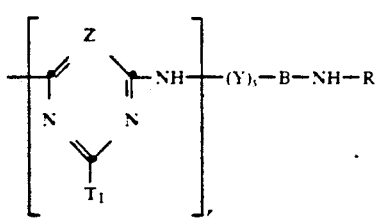
(7)

where B, R, Y, T₁, Z, r and s are as defined under the formula (1), or condensing an amine of the formula (6), where X, m, n and q are as defined under the formula (1) with a compound of the formula

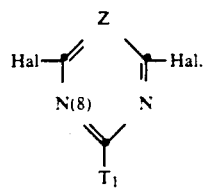
(8)

where Z and T₁ are as defined under the formula (1), and each Hal is a halogen atom, in particular a fluorine or chlorine atom, and then reacting the condensation product with a compound which introduces the radical $$-NH-B-NH-R \qquad (9)$$

where B and R in the formula (9) are as defined under the formula (1).

The compound introducing the radical of the formula (7) is preferably a corresponding halide, in particular a chloride or fluoride. Specific examples are:

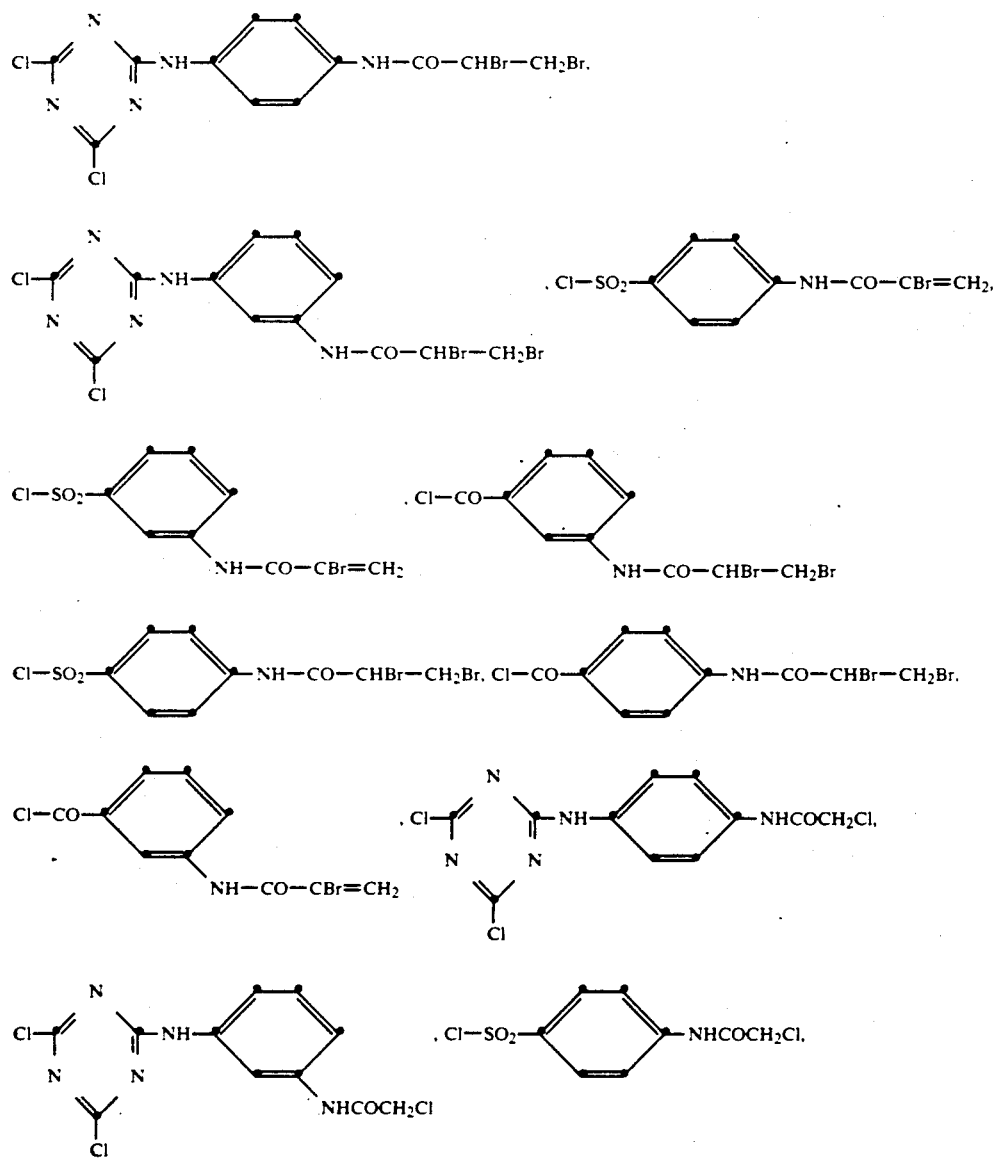

-continued

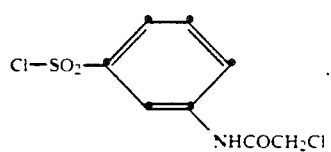 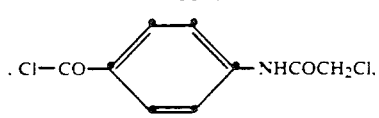

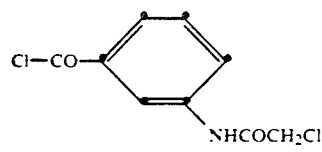 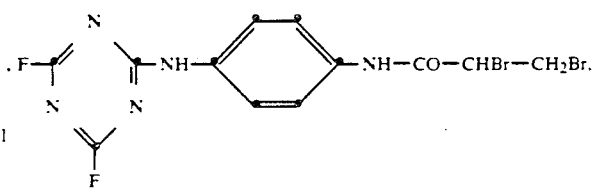

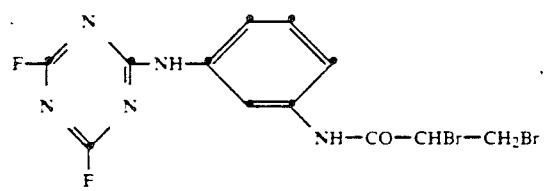

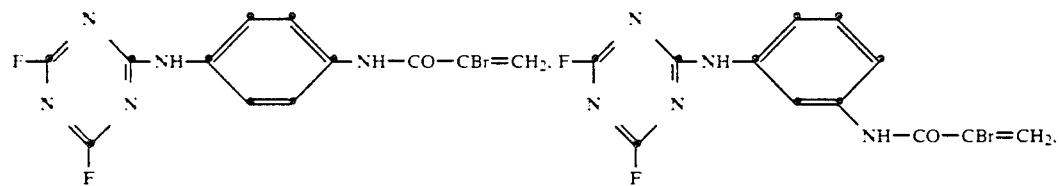

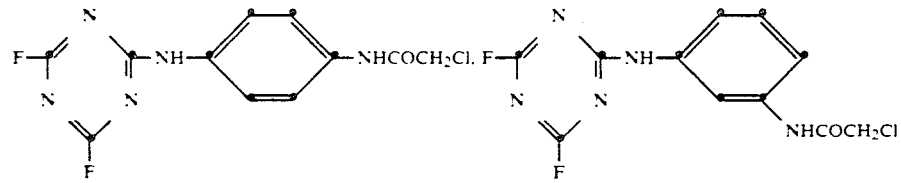

In a preferred embodiment of the process according to the invention, a compound of the formula (6) is first condensed with a compound of the formula

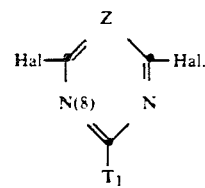

where Z and $T_1$ are as defined under the formula (1) and each Hal is a halogen atom, in particular a fluorine or chlorine atom, and the condensation product is then reacted with a compound introducing the radical of the formula

—NH—B—NH—R      (9)

where B and R in the formula (9) are as defined under the formula (1). Examples of compounds of the formula (8) are: cyanuric chloride, cyanuric fluoride and 2,4,6-trifluoro-5-chloropyrimidine. Examples of compounds introducing the radical of the formula (9) are: 3'-amino-2,3-dibromopropionylanilide, 4'-amino-2,3-dibromopropionylanilide, 3'-amino-2-bromoacryloylanilide, 4'-amino-2-bromoacryloylanilide, 3'-aminochloroacetanilide and 4'-aminochloroacetanilide.

In a likewise preferred embodiment of the process according to the invention, a compound of the formula (6) is reacted with a compound introducing the radical of the formula

—Y—B—NH—R      (10)

where Y, B and R are as defined under the formula (1). Examples of compounds which introduce the radical of the formula (10) are corresponding acid halides, preferably acid chlorides such as

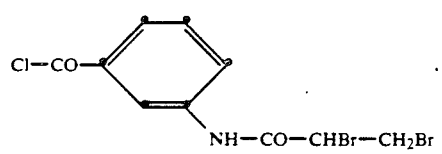

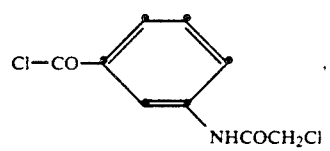

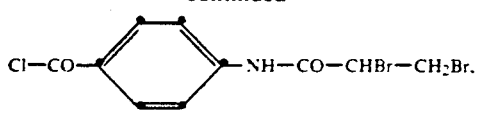

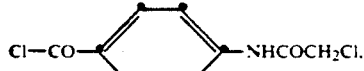

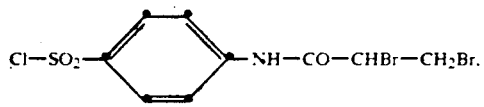

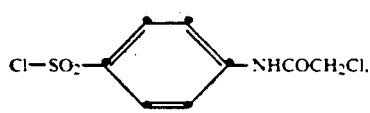

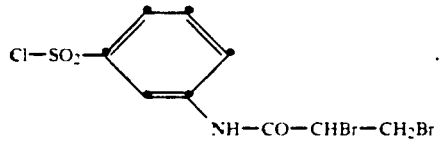

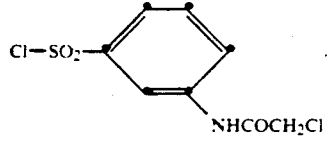

The compounds of formula (10), which include a detachable group, preferably a halogen atom, and which conform to the formula

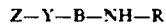  (10a)

form a further part of the subject-matter of the present invention. Z in the formula (10a) is a detachable group, in particular a halogen atom, preferably chlorine. Y, B and R are as defined in the formula (1). Preferably, B and R have the abovementioned preferred meanings.

The compounds of the formula (10a) are prepared by condensing for example a compound of the formula

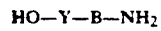  (10b)

where Y and B are as defined under the formula (1) with a compound which introduces the radical R, and the condensation product is then reacted with a compound which introduces the group Z.

In particular, use is made of a compound of the formula (10b) where B is —(CH$_2$)$_p$— or

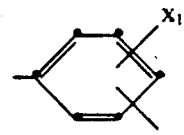

p is 1, 2, 3, 4, 5 or 6, and X$_1$ is hydrogen or a substituent other than sulfo.

Examples of compounds which introduce the radical R are 2,3-dibromopropionyl chloride or 2-bromoacryloyl chloride.

An example of a compound which introduces the group Z is thionyl chloride.

In a further very particularly preferred embodiment of the novel process for preparing the dyes of the formula (1), a compound of the formula (6) is reacted with a compound of the formula

  (10c)

where Z, Y and B are as defined under the formula (10a), the reaction product then hydrolyses in the presence of a base, such as NaOH, and the hydrolysed product is then condensed with a compound which introduces the radical R.

Suitable compounds of the formula (10c) are for example:

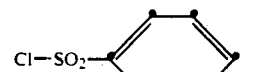

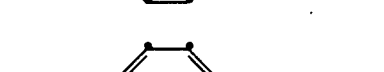

Examples of compounds which introduce the radical R are 2,3-dibromopropionyl chloride, 2-bromoacryloyl chloride and α-chloroacetyl chloride.

The preparation of the dyes of the formula (1) having a dihalopropionyl group can be followed by an elimination reaction. For example, the dye of the formula (1) which contains a dihalopropionyl group can be treated under alkaline conditions, such as sodium hydroxide, to eliminate hydrogen halide and convert the dihalopropionyl radical into a haloacryloyl radical.

The condensation of the amine of the formula (6) with compound which introduces the radical of the formula (7), or the condensation of the amine of the formula (6) with the compound of the formula (8) and the subsequent reaction with the compound which introduces the radical (9), and the condensation of the amine of the formula (6) with the compound which introduces the radical of the formula (10) are each preferably carried out in aqueous solution, emulsion or suspension at a low temperature, for example at 0° to 40° C. and at a weakly acid, neutral or weakly alkaline pH. Advantageously, the hydrogen halide set free in the course of the condensation is continuously neutralized by addition of aqueous alkali metal hydroxides, carbonates or bicarbonates.

In a preferred embodiment of the process according to the invention, use is made of an amine of the formula (6) where m is 2.

In a further preferred embodiment of the process according to the invention, use is made of an amine of the formula (6) where q is 1.

In a likewise preferred embodiment of the process according to the invention, use is made of an amine of the formula (6) where X is halogen, in particular chlorine, in particular of an amine of the formula (6) where X is chlorine, m is 2 and q is 1, together with a compound which introduces the radical of the formula (7).

In a further preferred embodiment of the process according to the invention, use is made of a compound which introduces the radical of the formula (7), (8) or (9) where B is $-(CH_2)_p-$ or

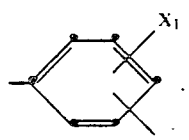

p is 1, 2, 3, 4, 5 or 6, and $X_1$ is hydrogen or a substituent other than sulfo.

More particularly, use is made of an amine of the formula (6) where m is 2, q is 1 and X is chlorine together with a compound which introduces the radical of the formula (7) where B has the preferred meaning given above. Preference is also given to using amines of the formula (6) where n is 0 or 1; in particular together with the abovementioned preferred meanings of the radicals m, q and X.

Preference is further given to compounds of the formula (7) or of the formula (8) where $T_1$ is fluorine or in particular chlorine and Z is $-C-F$ or $-C-Cl$ or in particular a nitrogen.

In a particularly preferred embodiment of the novel process for preparing dyes of the formula (2), a compound of the formula

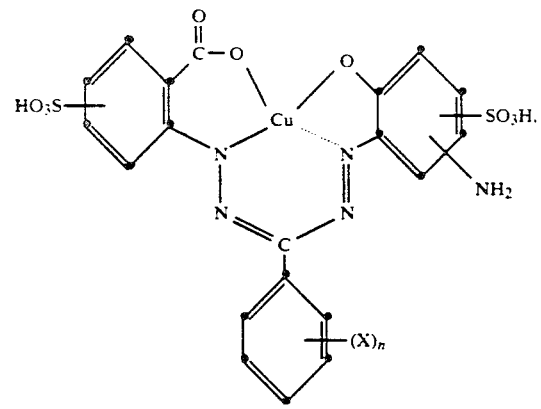

where X and n are as defined under the formula (2), is either condensed with a compound of the formula (8) and afterwards the condensation product is reacted with a compound which introduces the radical of the formula (9), or with a compound which introduces the radical of the formula (10), B, R, $T_1$, X, Y and n being as defined under the formula (2).

In a very particularly preferred embodiment of the novel process for preparing the dyes of the formula (3), an amine of the formula

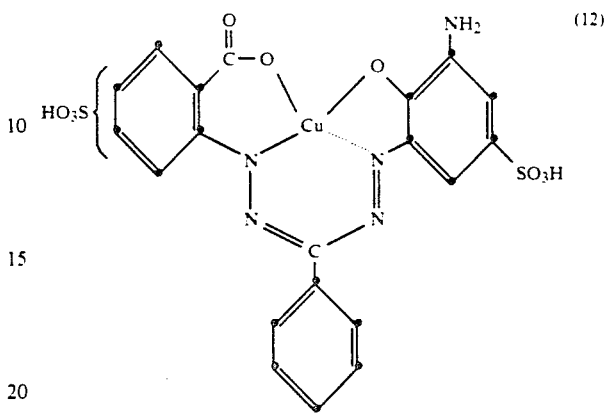

is either condensed with cyanuric chloride or cyanuric fluoride and afterwards the condensation product is reacted with a compound which introduces the radical of the formula (9), or is reacted with a compound which introduces the radical of the formula (10), R and Y being as defined under the formula (3).

The particularly important dyes of the formula (4) are prepared by condensing an amine of the formula

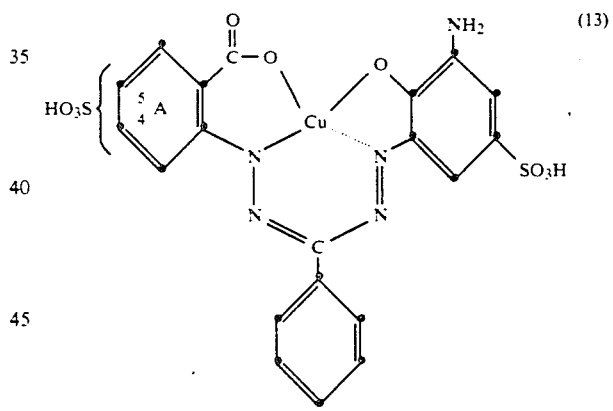

where the sulfo group is bonded to the benzo ring A in the 4- or 5-position, with cyanuric chloride or cyanuric fluoride and then reacting the condensation product with a compound of the formula

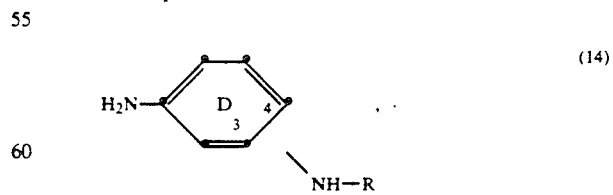

where R is as defined under formula (4) and $-NHR$ is bonded to the benzo ring D in the 3- or 4-position.

The particularly important dyes of the formula (5) are prepared by reacting an amine of the formula (13) with a compound of the formula

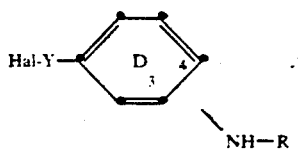

(15)

where Hal is halogen, in particular chlorine, Y and R are as defined under the formula (5) and —NH—R is bonded to the benzo ring D in the 3- or 4-position.

The compounds of the formula (6) are known per se or can be prepared similarly to known compounds. For the preparation of the copper complexes of the tetradentate formazans, reference may be made to K. Venkataraman, The Chemistry of Synthetic Dyes, Volume VI, pages 287 to 297, Academic Press New York and London (1972), and Ullmanns Encyklopädie der technischen Chemie, Volume 11, pages 714 to 718, Verlag Chemie (1976).

The compounds which introduce the radical of the formula (7), (9) or (10) and the compounds of the formula (8) are likewise known per se or can be prepared similarly to known compounds.

The dyes of the formula (1) are suitable for dyeing and printing a wide range of fibre materials, in particular textile fibre materials, for example silk, fibre materials made of cellulose and in particular wool, synthetic polyamide fibre materials, for example nylon-6- and nylon 6,6, and leather. The dyes of the formula (1) give level dyeings in blue shades having good all round fastness properties, in particular good wet fastness, such as wet rub fastness, and good light fastness. Furthermore, the dyes of formula (1) are very highly compatible with other reactive dyes. The abovementioned textile material can be present in a very wide range of processing forms, for example as yarn, woven fabric or knitted fabric.

It is to be noted that the dyes of the formula (1) according to the invention show high reduction stability, have good dyeing characteristics, give a high rate of fixation and high levelness in the fibre and the piece, and do not show any dichroism.

The novel dyes of the formula (1) which contain at least one sulfo group are present either in the form of their free acid or preferably as a salt thereof. Examples of possible salts are alkali metal, alkaline earth metal or ammonium salts or the salts of an organic amine. Examples are the sodium, lithium, potassium or ammonium salts and the salt of triethanolamine.

It is further to be noted that the novel dyes of the formula (1) are suitable for the trichromatic dyeing and printing of natural or synthetic polyamide fibre materials together with a fibre-reactive yellow- or orange-dyeing dye and a fibre-reactive red-dyeing dye.

Trichromatic relates to the additive mixture of suitably selected yellow- or orange-, red- and blue-dyeing dyes with which any desired shade of the visible spectrum can be matched through a suitable choice of the mixing ratios.

The dyes to be used in the trichromatic process should combine a uniform colour build-up with a constant shade at various concentrations and good compatibility.

The present invention accordingly provides a process for the trichromatic dyeing or printing of natural and synthetic polyamide fibre materials with mixtures of fibre-reactive dyes, which comprises using a blue-dyeing dye of the formula (1) together with a yellow- or orange-dyeing sulfo-containing reactive dye and a red-dyeing sulfo-containing reactive dye.

Use is made in particular of fibre-reactive sulfo-containing yellow- or orange- and red-dyeing azo dyes where the fibre-reactive group is preferably a halotriazine or halopyrimidine group or a group of the aliphatic series.

A halopyrimidine or aliphatic fibre-reactive group is preferably difluorochloropyrimidinyl, in particular 2,4-difluoro-5-chloropyrimidinyl, on the one hand or $\alpha,\beta$-dihalopropionyl, in particular $\alpha,\beta$-dibromopropionyl, or $\alpha$-haloacryloyl, in particular $\alpha$-bromoacryloyl on the other.

Examples of yellow- or orange-dyeing sulfo-containing fibre-reactive dyes are the following:

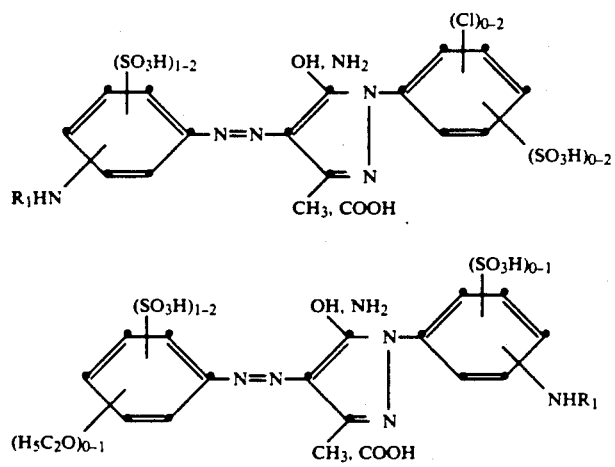

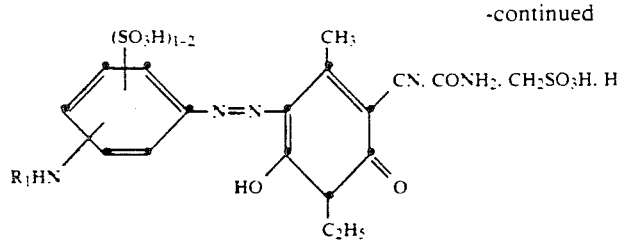
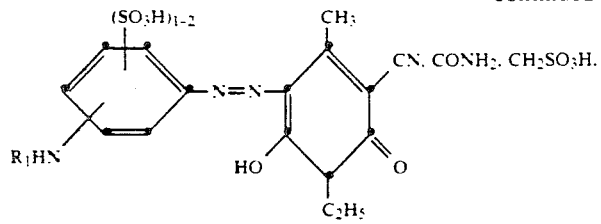
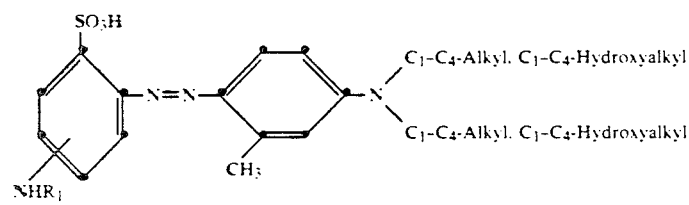
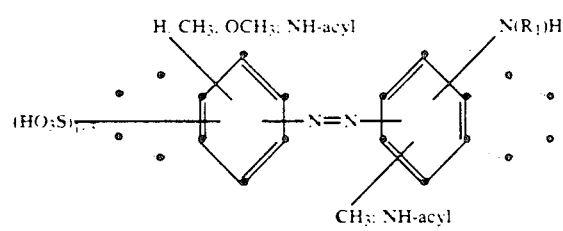
Examples of red-dyeing sulfo-containing fibre-reactive dyes are the following:
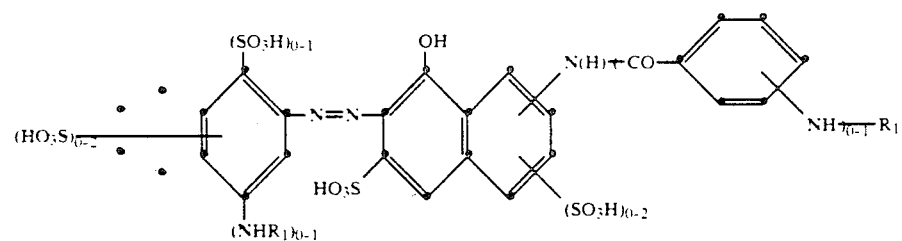
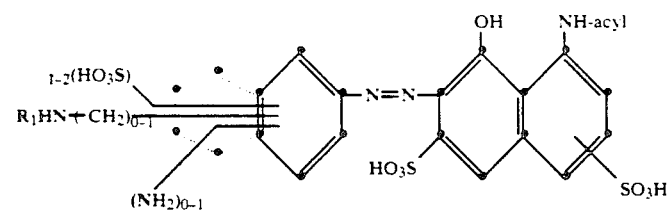
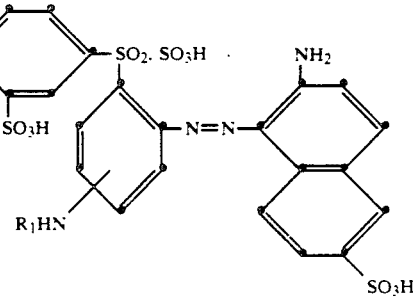
where acyl is for example acetyl or substituted or unsubstituted benzoyl.
The fused rings indicated by dots represent alternatively possible naphthalene systems.

-continued

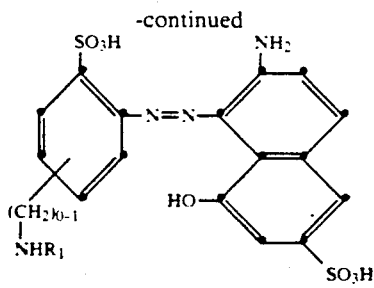

-continued
or

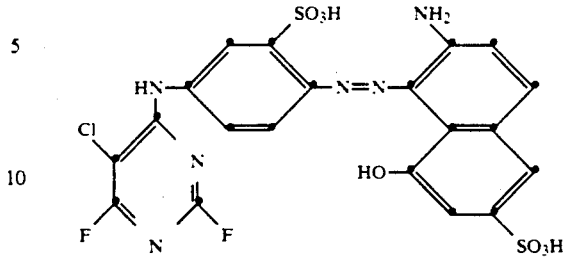

In the foregoing formulae, $R_1$ is a fibre-reactive radical, in particular a fibre-reactive radical of the halotriazine or halopyrimidine series or of the aliphatic series, $R_1$ preferably being difluorochloropyrimidinyl or $\alpha,\beta$-dihalopropionyl or $\alpha$-bromoacryloyl. Particularly preferably, $R_1$ is 2.4-difluoro-5-chloropyrimidin-6-yl, $\alpha,\beta$-dibromopropionyl or $\alpha$-bromoacyloyl.

In the novel process for the trichromatic dyeing or printing of natural and synthetic polyamide fibre materials, the blue-dyeing dyes used are those mentioned above, in particular those of the formulae (2) and (3), very particularly preferably the dyes of the formulae (4) and (5).

Particularly preferred yellow- or orange-dyeing dyes are:

The yellow- or orange- and red-dyeing dyes used in the novel process for trichromatic dyeing or printing are known or can be prepared similarly to known dyes. The dyes are present either in the form of their free sulfonic acid or preferably as a salt thereof, in which case it is possible to use the same salts as indicated for the dyes of the formula (1).

The amounts in which the dyes of the formula (1) and the yellow- or orange- and red-dyeing fibre-reactive dyes are used in the dyebaths or print pastes can vary within wide limits, depending on the desired depth of shade; in general, amounts of from 0.01 to 10 per cent by weight, in particular of 2 to 10 per cent by weight, based

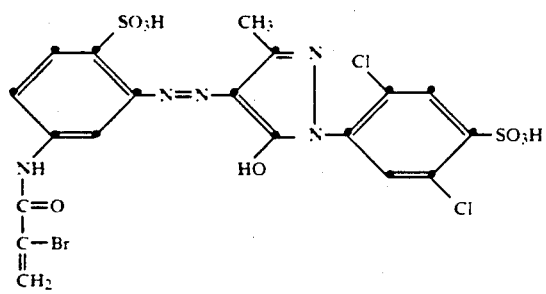

or

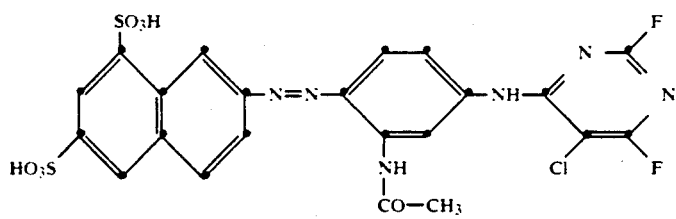

Particularly preferred red-dyeing dyes are:

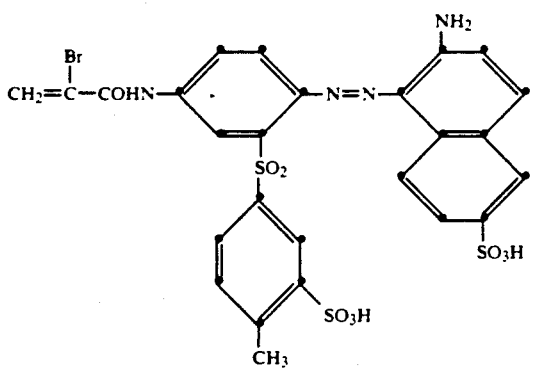

on the material to be dyed or the print paste, have proved to be advantageous.

Preference is given to using in the process according to the invention fibre-material made of natural polyamides, in particular wool.

Special equipment is not required in the process according to the invention. It is possible to use the customary dyeing and printing machines, for example for loose fibre, fluffing, hanks, packages, piece goods and carpets.

As well as the reactive dye aqueous dyebaths may contain assistants, in particular levelling assistants. Levelling assistants are used in an amount of 0.3 to 3 per cent by weight, based on the fibre material.

Further assistants which may be present in the dyebaths are mineral acids, such as sulfuric acid, sulfamic acid or phosphoric acid, organic acids, advantageously lower aliphatic carboxylic acids, such as formic acid, acetic acid or maleic acid. The acids are used in particular to adjust the pH of the liquors to be used according to the invention.

Preferably, the pH of 3 to 6 is set with an organic acid, in particular formic acid or acetic acid.

Preference is given to dyeing at a pH of 4 to 6, in particular 4.2 to 5.5.

It is also possible for the dyeing liquor to contain various salts, in particular ammonium salts or alkali metal salts, for example ammonium sulfate or sodium sulfate, as assistants.

The liquor ratio can be varied within a wide range, for example from 6:1 to 80:1, preferably from 10:1 to 50:1.

Dyeing takes place from an aqueous liquor by the exhaust method, for example at a temperature between 80° and 105° C. or 110° C. using a formaldehyde-eliminating wool preservative, preferably between 98° and 103° C.

The dyeing time is in general 30 to 90 minutes.

In a particularly preferred embodiment of the process according to the invention, the dyeing liquor, having been used for dyeing at preferably 98° to 103° C., is cooled down to about 75° to 90° C. and the pH is adjusted to 8 to 9, preferably to about 8.5. The pH can be adjusted by customary means, for example alkali metal hydroxide solutions and in particular by means of aqueous ammonia solution of customary concentration, containing for example 25 percent by weight of ammonia.

In the Examples, parts are by weight. The temperatures are degrees Celsius. Parts by weight bear the same relation to parts by volume as that between gram and cubic centimeter.

EXAMPLE 1

13.24 parts of the dye of the formula (101)

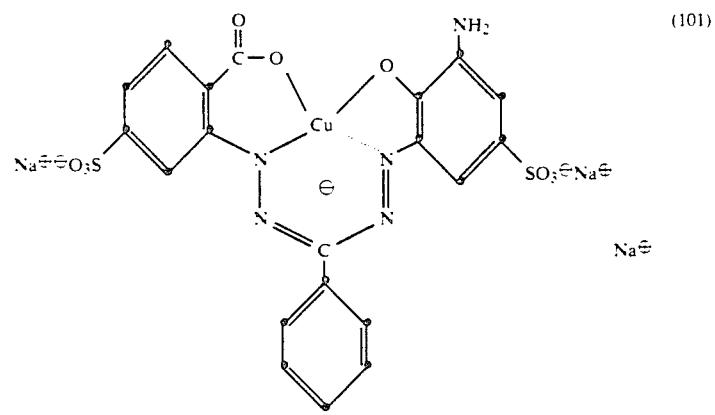

are taken up in 200 parts of water, admixed with 0.6 part of disodium hydrogenphosphate and heated to 40°, when the sodium hydroxide solution is added to pH 6.5 and a clear solution forms. After cooling to 0°-2° a solution of 3.9 parts of cyanuric chloride in 25 parts of acetone is added dropwise in the course of 2-3 minutes, during which the pH is maintained at 6.25 with sodium hydroxide solution.

After the reaction has ended, a solution of 7.72 parts of 4'-amino-2,3-dibromopropionylanilide in 1:2 water-/acetone is added dropwise at 0°-5° in the course of 5 minutes, during which the pH is kept at a constant 6.25 with sodium hydroxide solution. After stirring overnight, the dye is filtered off with suction, washed with sodium chloride solution and dried at 60°-70°. 25.1 parts are obtained of a dye of the formula (102) which dyes wool in fast blue shades.

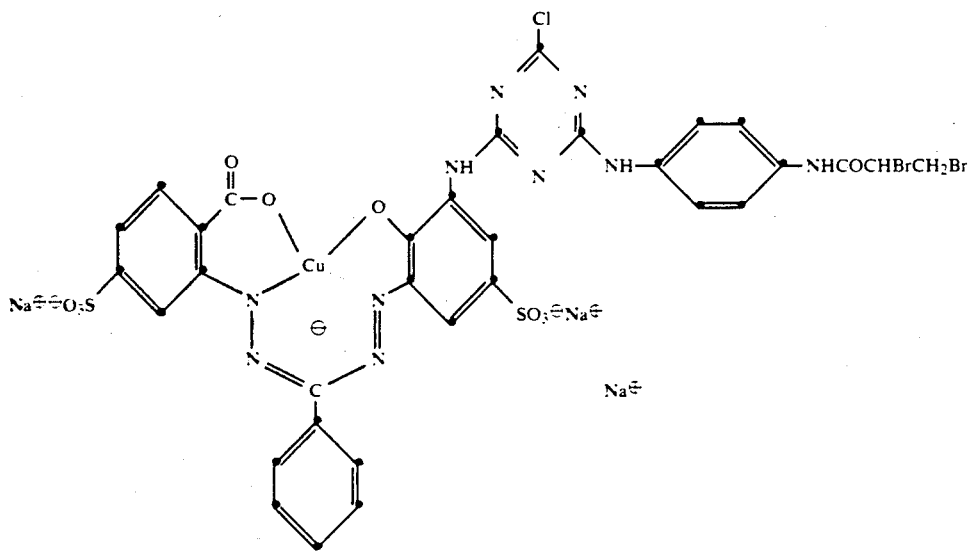

(102)

EXAMPLE 2

3 parts of the dye of the formula (102) of Example 1 are dissolved in 50 parts of water. The solution is adjusted to pH 12 with sodium hydroxide solution and maintained at 40° for 2 hours. After cooling, the pH is reduced to 7, sodium chloride is added, and the dye is filtered off with suction, washed with sodium chloride solution and dried at 60°-70°. 3.1 g are obtained of the dye of the formula (103) which dyes wool in fast blue shades.

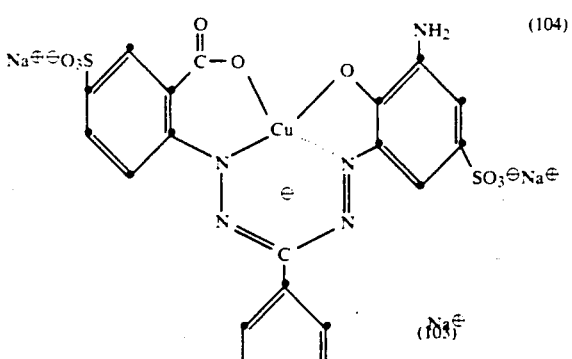

(104)

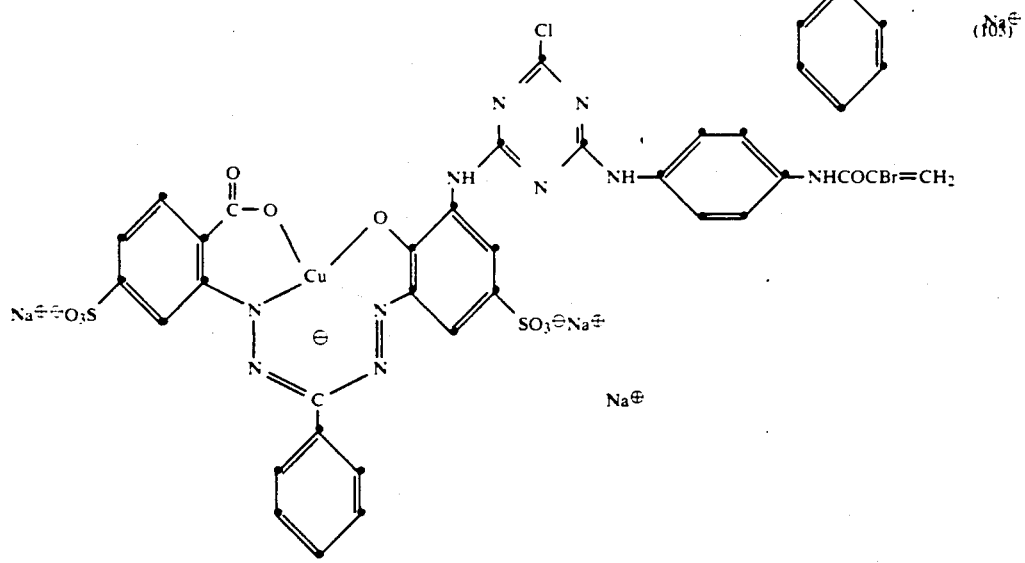

(103)

EXAMPLE 3

Example 1 is repeated, except that the dye of the formula (101) is replaced by an equimolar amount of the dye of the formula affording a dye of the formula (105) which dyes wool in fast blue shades.

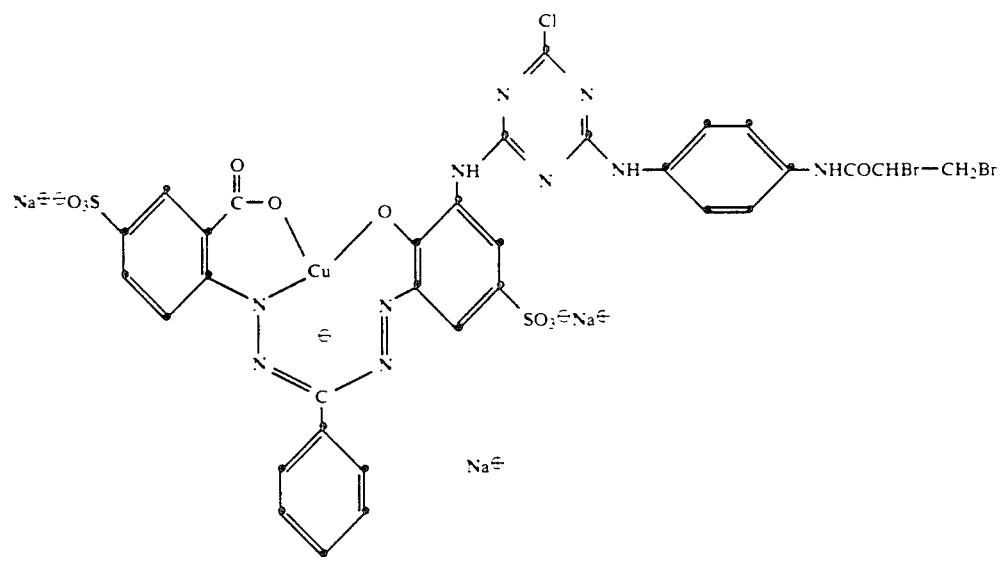

(105)

EXAMPLE 4

Example 2 is repeated, except that the dye of the formula (102) is replaced by the dye of the formula (105) of Example 3, affording the dye of the formula (106) which dyes wool in fast blue shades.

EXAMPLES 5 TO 8

The procedure of Examples 1 to 4 is repeated, except that 4'-amino-2,3-dibromopropionylanilide is replaced by an equimolar amount of 3'-amino-2,3-dibromopropionylanilide, affording the dyes listed in column 2 of Table 1 which dye wool in the shades indicated in column 3.

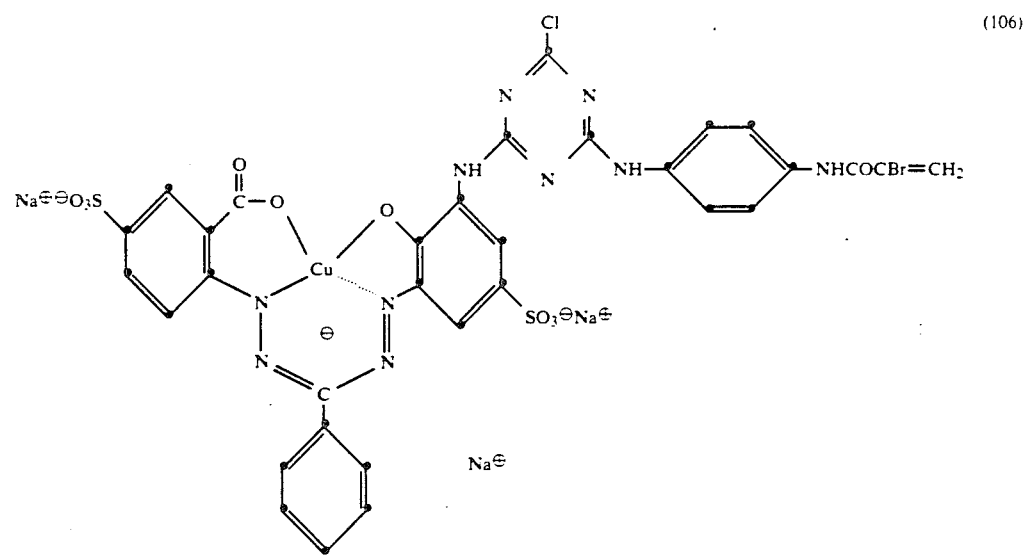

(106)

TABLE 1
| Ex. | Dye | Hue on wool |
|---|---|---|
| 5 | 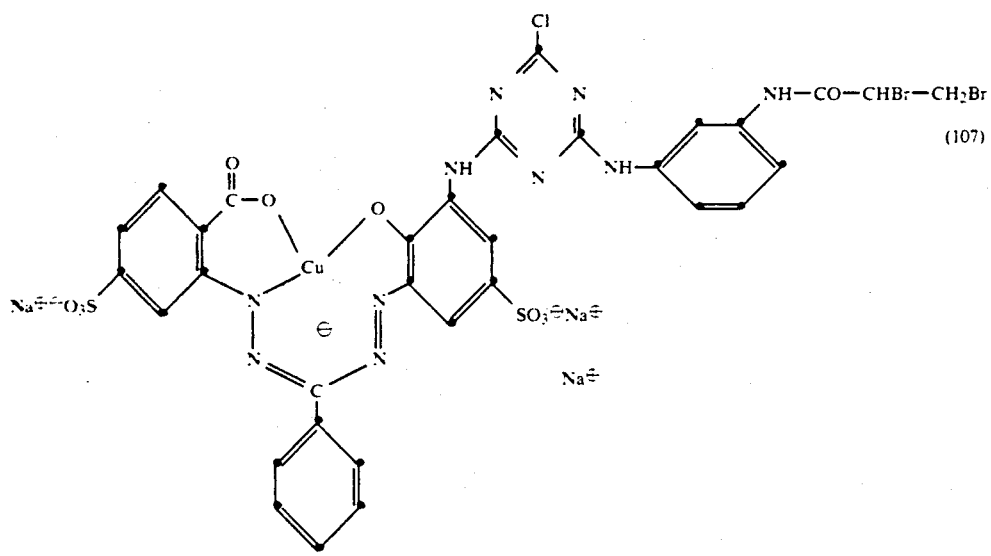 (107) | blue |
| 6 | 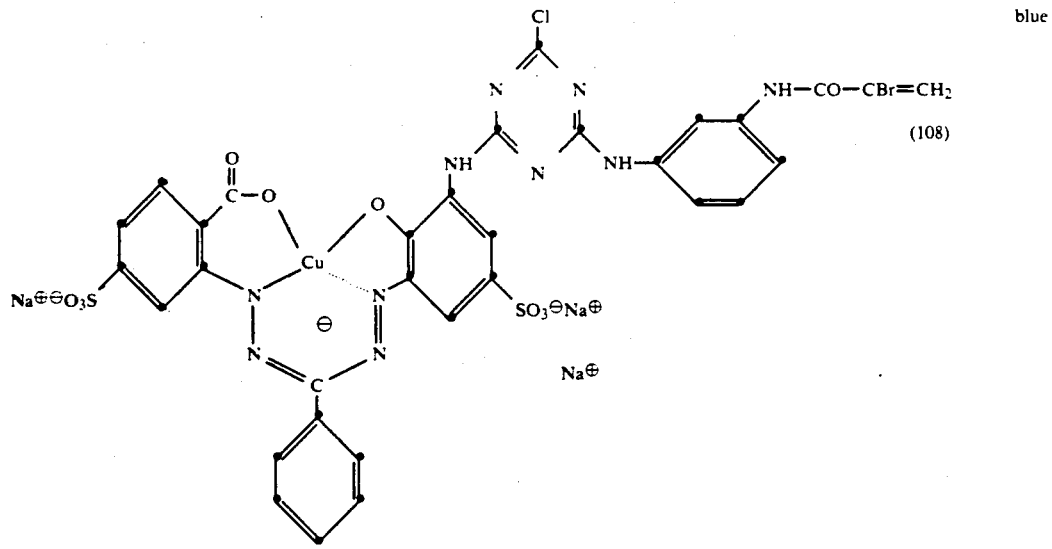 (108) | blue |

TABLE 1-continued

| Ex | Dye | Hue on wool |
|---|---|---|
| 7 | (109) [structure with Cu complex, chlorotriazine, NH—CO—CHBr—CH₂Br substituent] | blue |
| 8 | (110) [structure with Cu complex, chlorotriazine, NH—CO—CBr=CH₂ substituent] | blue |

EXAMPLE 9

6.62 parts of the dye of the formula (104) of Example 3 are dissolved in 50 parts of water at pH 7 by adding hydrochloric acid. After 0.84 part of sodium bicarbonate has been added, a solution of 6.1 parts of 4-(2',3'-dibromopropionamido)benzenesulfonyl chloride (prepared by reacting sulfanilic acid with 2,3-dibromopropionyl chloride and subsequent conversion into the corresponding sulfonyl chloride with thionyl chloride in the presence of dimethylformamide) in 25 parts of acetone is added dropwise at room temperature in the course of 10-15 minutes, during which the pH is maintained at 7 with sodium hydroxide solution. After one hour at 30° and stirring at room temperature, the dye is precipitated by the addition of sodium chloride, filtered off with suction, washed with sodium chloride solution and dried at 60°-70°. 11 parts are obtained of the dye of the formula (111) which dyes wool in fast blue shades.

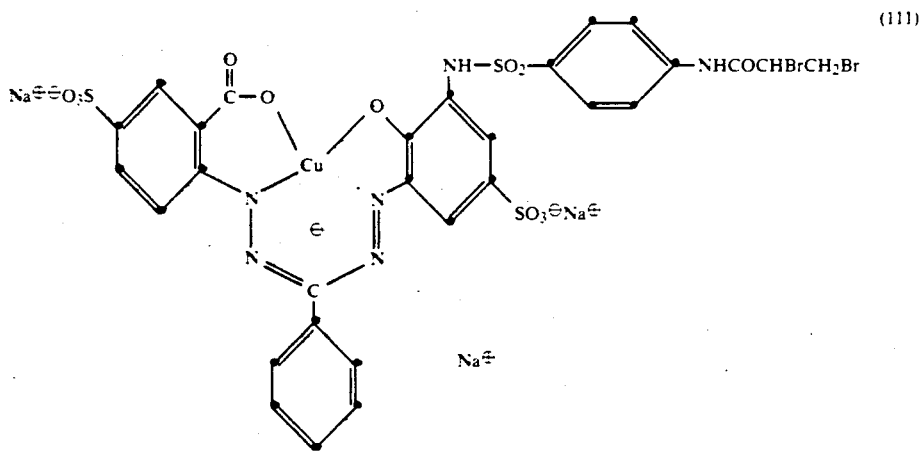

(111)

EXAMPLE 10

Example 9 is repeated, except that a solution of 6.62 parts of the dye of the formula (101) of Example 1 in 100 parts of water and 0.3 part of disodium hydrogenphosphate are used, affording 11 parts of a dye of the formula (112) which dyes wool in fast blue shades.

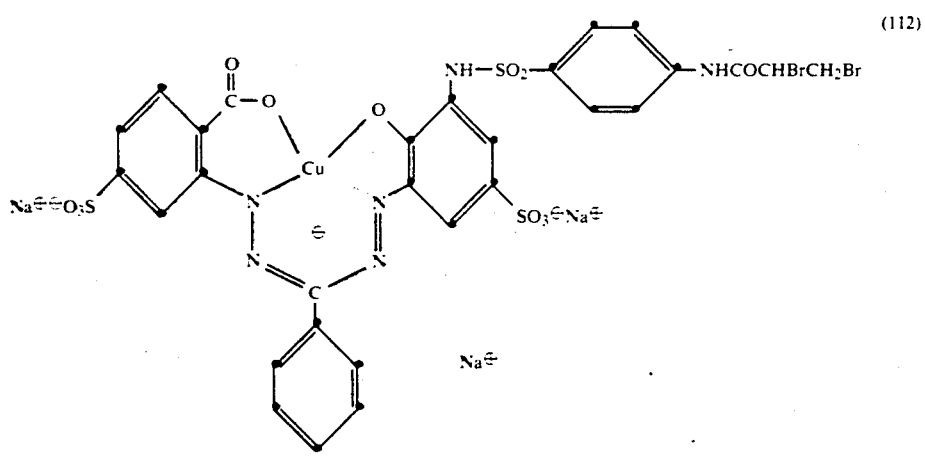

(112)

EXAMPLES 11 AND 12

5.5 parts of the dye of the formula (111) or (112) are stirred in 100 parts of water in the presence of sodium hydroxide solution at a pH of 12 to 12.5 and at 0° to 5° for one hour. The suspension is then brought to pH 7 with hydrochloric acid, and sodium chloride is added. The dye is filtered off with suction, washed with sodium chloride solution and dried at 60°–70°. This gives 5.3 parts of the dye of the formula (113) or 5.6 parts of the dye of the formula (114), which both dye wool in fast blue shades.

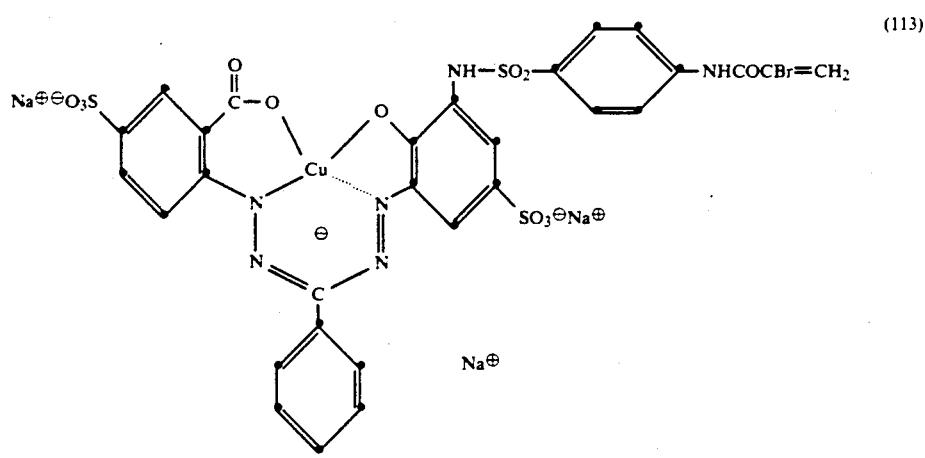

(113)

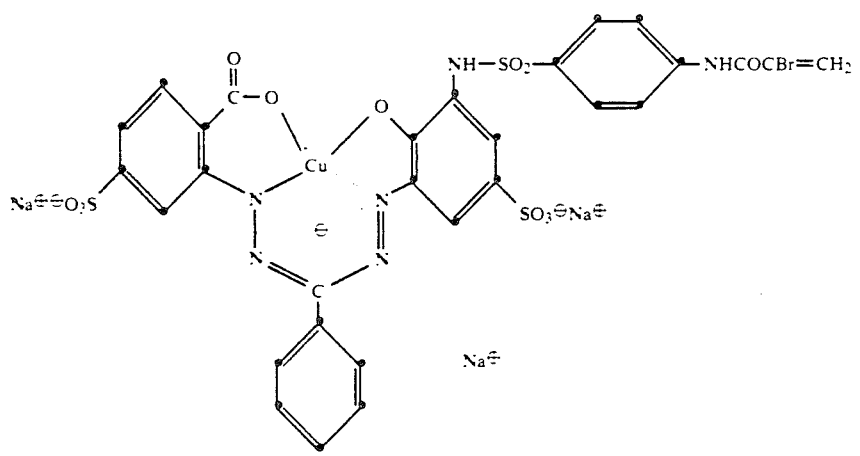
(114)
EXAMPLES 13 TO 16
The procedure of Examples 9 to 12 is repeated, except that the 6.1 parts of 4-(2',3'-dibromopropionamido)benzenesulfonyl chloride are replaced by an equimolar amount of 3-(2',3'-dibromopropionamido)benzenesulfonyl chloride, affording the dyes indicated in column 2 of Table 2 which dye wool in the shades indicated in column 3.
TABLE 2
| Ex | Dye | Hue on wool |
|---|---|---|
| 13 | (115) | blue |
| 14 | (116) | blue |

TABLE 2-continued

| Ex | Dye | Hue on wool |
|---|---|---|
| 15 | 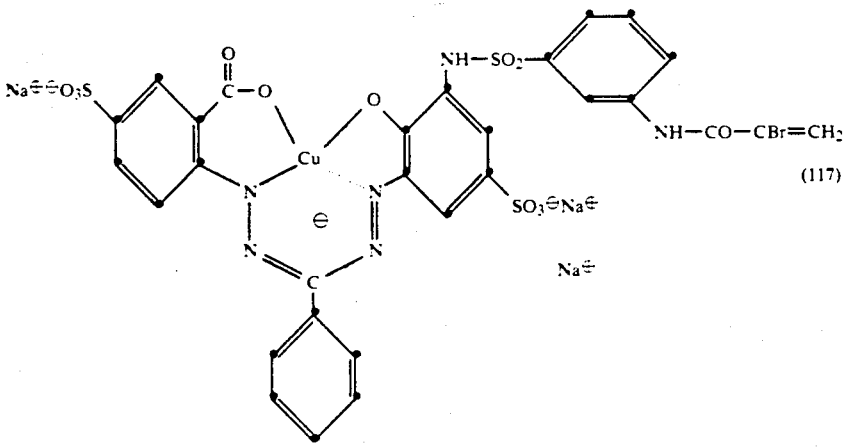 (117) | blue |
| 16 | 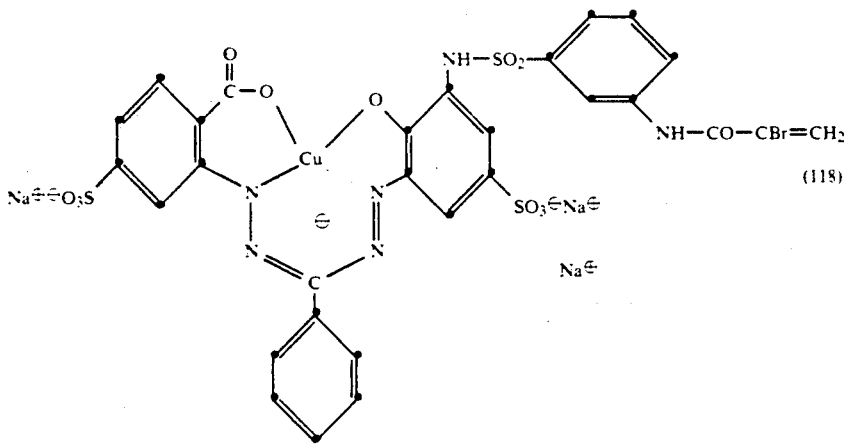 (118) | blue |

EXAMPLE 17

1.7 parts of the dye of the formula (104) in Example 3 are dissolved in 50 parts of water at pH 7 by adding hydrochloric acid, and a little disodium hydrogenphosphate is added. To this solution is added 1 part of 3-(2',3'-dibromopropionamido)benzoyl chloride (prepared by reacting 3-aminobenzoic acid with 2,3-dibromopropionyl chloride and subsequent conversion to the corresponding benzoyl chloride with thionyl chloride in the presence of dimethylformamide) dissolved in acetone, added dropwise in the course of 5 minutes. After stirring overnight at a constant pH of 7, maintained with sodium hydroxide solution, sodium chloride is added, and the dye is filtered off, washed with sodium chloride solution and dried at 60°–70°. 2.5 parts are obtained of a dye of the formula (119) which dyes wool in fast blue shades.

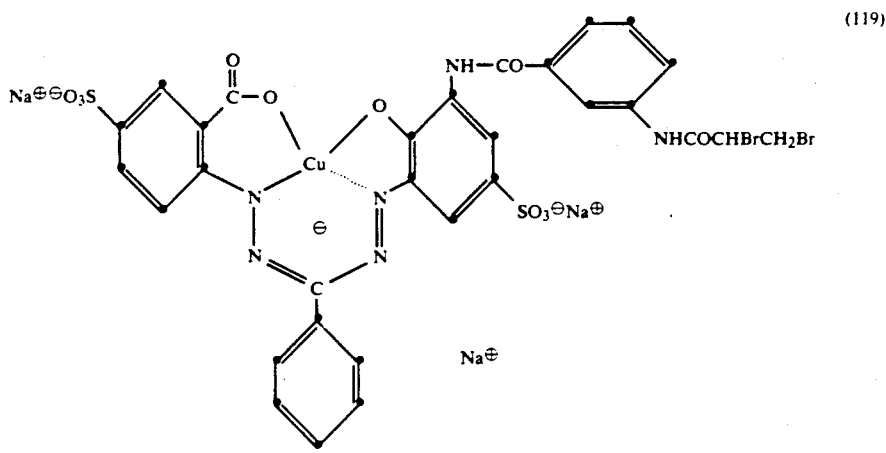

(119)

EXAMPLE 18 affording dyes of the formulae (121) and (122) which both dye wool in fast blue shades.

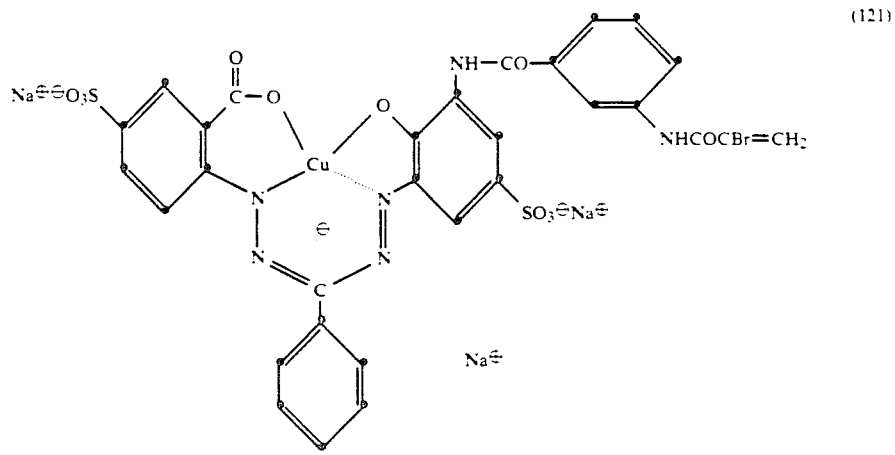

(121)

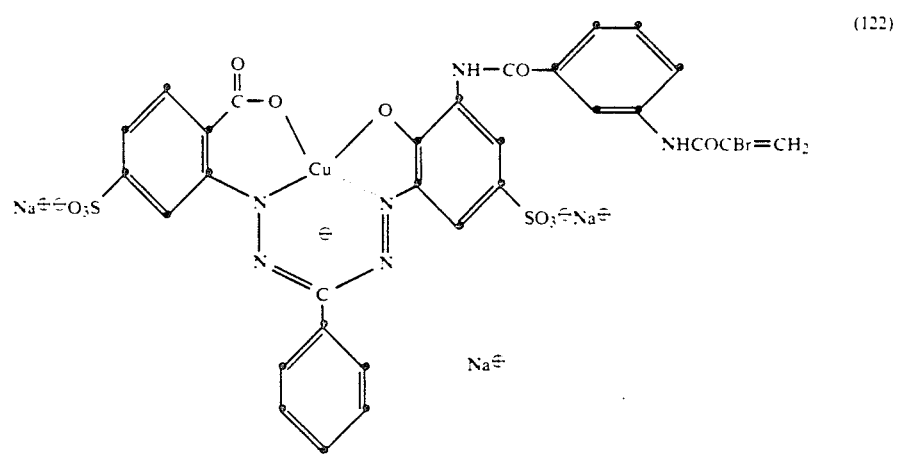

(122)

Example 17 is repeated, except that a dye of the formula (101) of Example 1 is used, affording 2.8 parts of a dye of the formula (120) which dyes wool in fast blue shades.

EXAMPLES 21 TO 24

The procedure of Examples 17 to 20 is repeated, except that the 3-(2',3'-dibromopropionamido)benzoyl chloride is replaced by an equimolar amount of 4-(2',3'-dibromopropionamido)benzoyl chloride, affording the dyes indicated in column 2 of Table 3 which dye wool in the shades indicated in column 3.

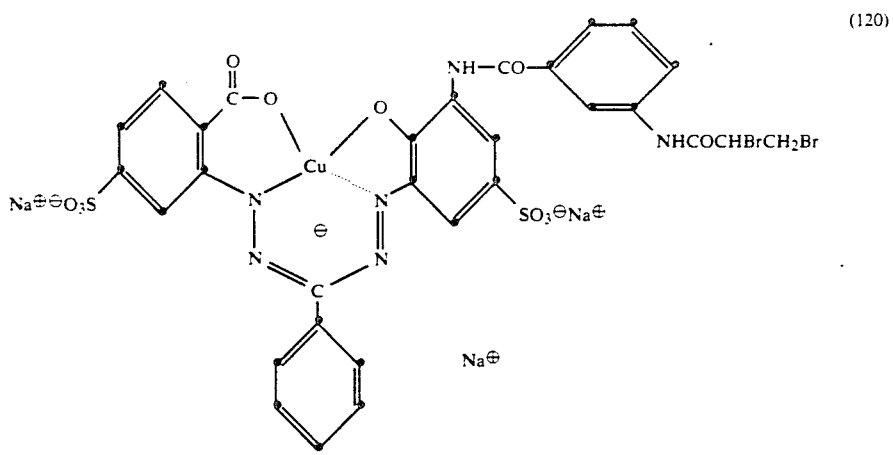

(120)

EXAMPLES 19 AND 20

The procedure of Examples 11 and 12 is repeated, except that the dyes of the formulae (111) and (112) are replaced by the dyes of the formulae (119) and (120),

TABLE 3
| Ex. | Dye | Hue on wool |
|---|---|---|
| 21 | 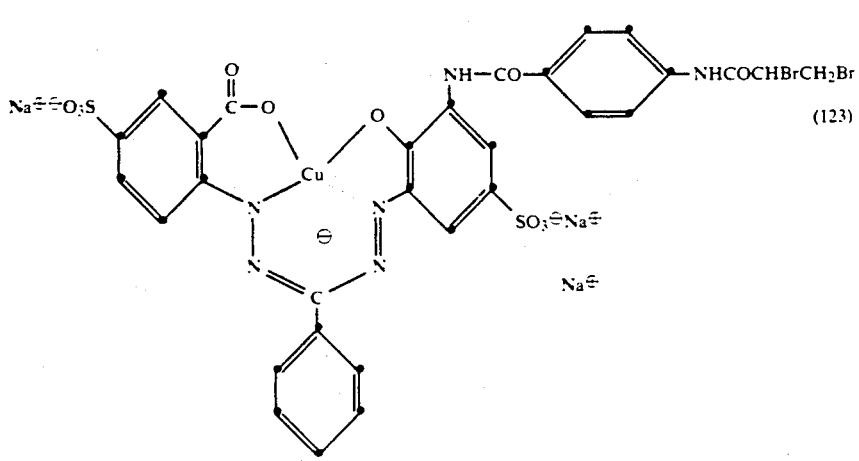 (123) | blue |
| 22 | 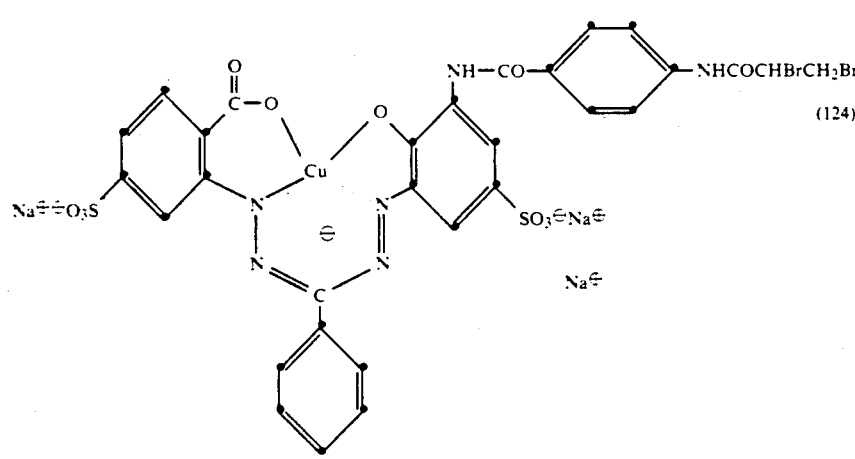 (124) | blue |
| 23 | 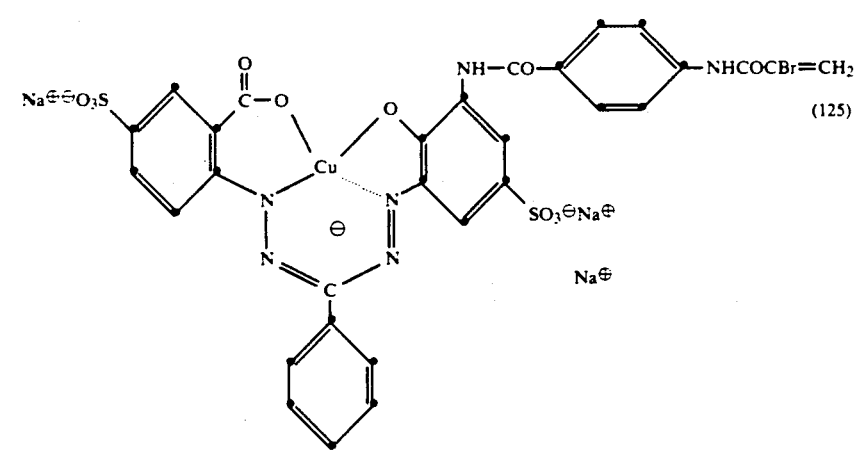 (125) | blue |

TABLE 3-continued

| Ex. | Dye | Hue on wool |
|---|---|---|
| 24 | 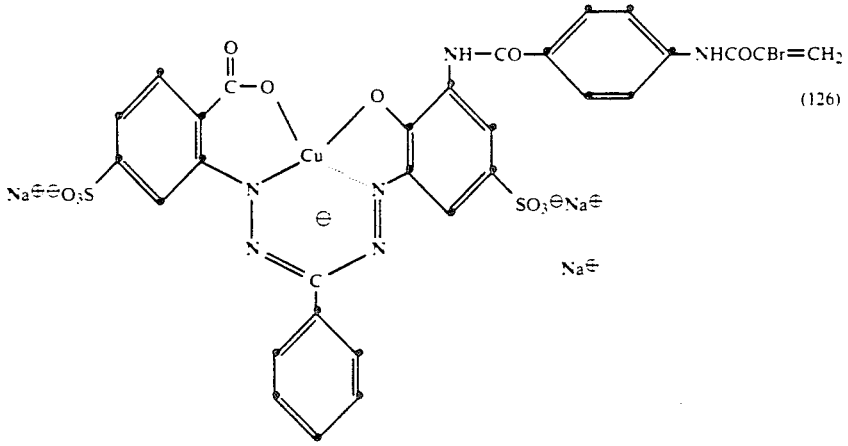 (126) | blue |

EXAMPLE 25

6.62 parts of the dye of the formula (101) are dissolved and reacted with cyanuric chloride, both steps being carried out as described in Example 1. A solution of 2.9 parts of 3'-amino-2-bromoacryloylanilide in 40 parts of acetone is then added dropwise at 0°-5° and at a pH of 6.5 in the course of 10 minutes. After stirring overnight, sodium chloride is added, and the dye is filtered off and washed with sodium chloride solution. Drying at 60°-70° leaves 12.6 parts of the dye of the formula (108).

EXAMPLE 26

Example 25 is repeated, except that the dye of the formula (101) is replaced by the dye of the formula (104), affording the dye of the formula (110).

EXAMPLES 27 AND 28

The procedure of Examples 25 and 26 is repeated, except that the 3'-amino-2-bromoacryloylanilide is replaced by an equimolar amount of 4'-amino-2-bromoacryloylanilide, affording dyes of the formulae (103) and (106).

EXAMPLES 29 TO 36

The procedure of Examples 1 to 8 is repeated, except that the cyanuric chloride is replaced by an equimolar amount of cyanuric fluoride, affording the dyes indicated in column 2 of Table 4 which dye wool in the shades indicated in column 3.

TABLE 4

| Ex. | Dye | Hue on wool |
|---|---|---|
| 29 | 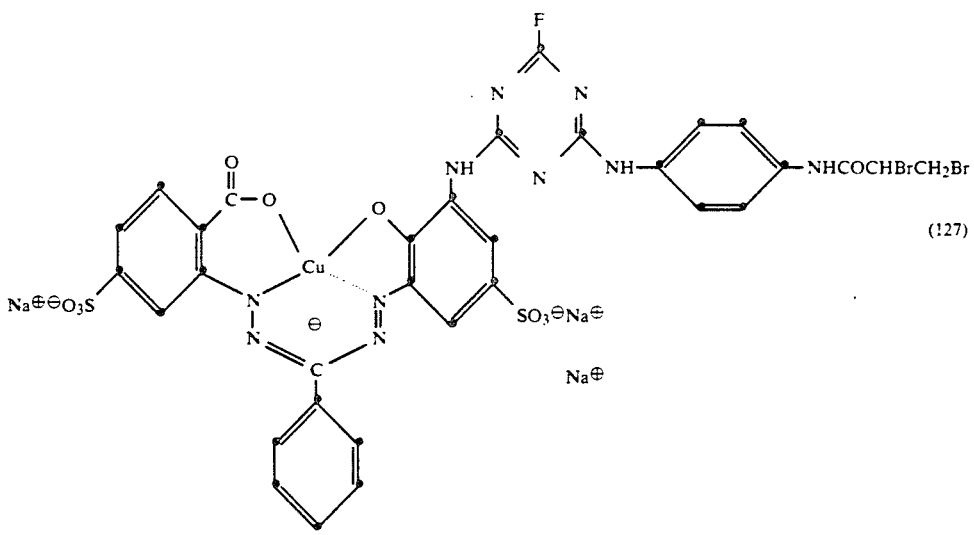 (127) | blue |

TABLE 4-continued
| Ex. | Dye | Hue on wool |
|---|---|---|
| 30 | 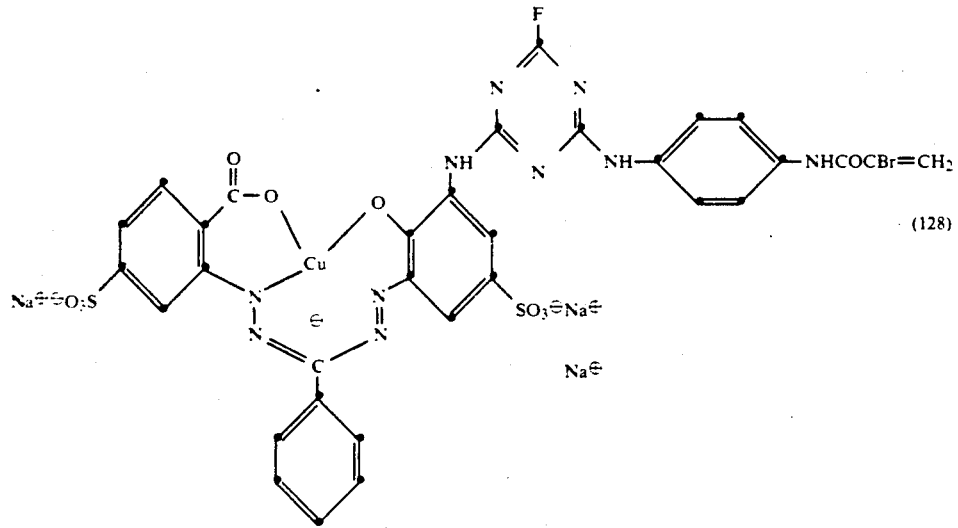 (128) | blue |
| 31 | 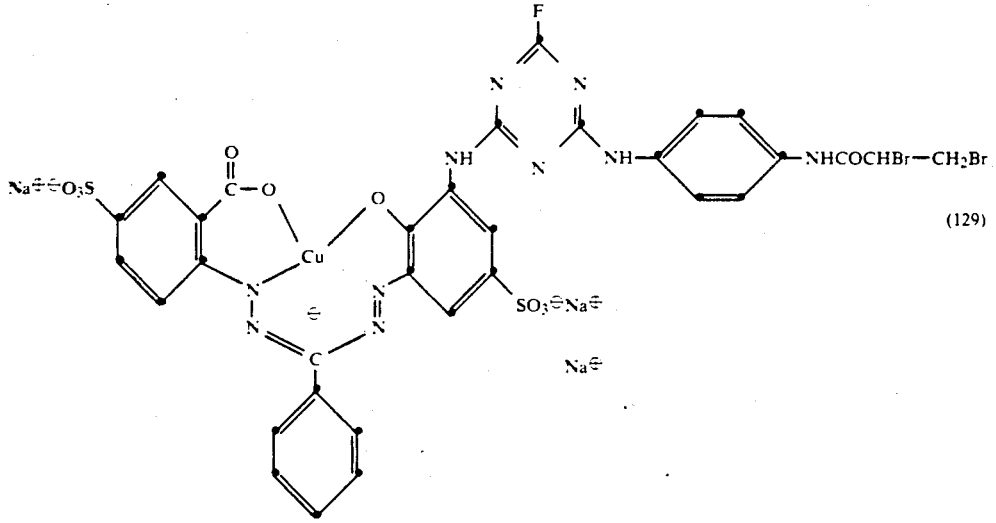 (129) | blue |
| 32 | 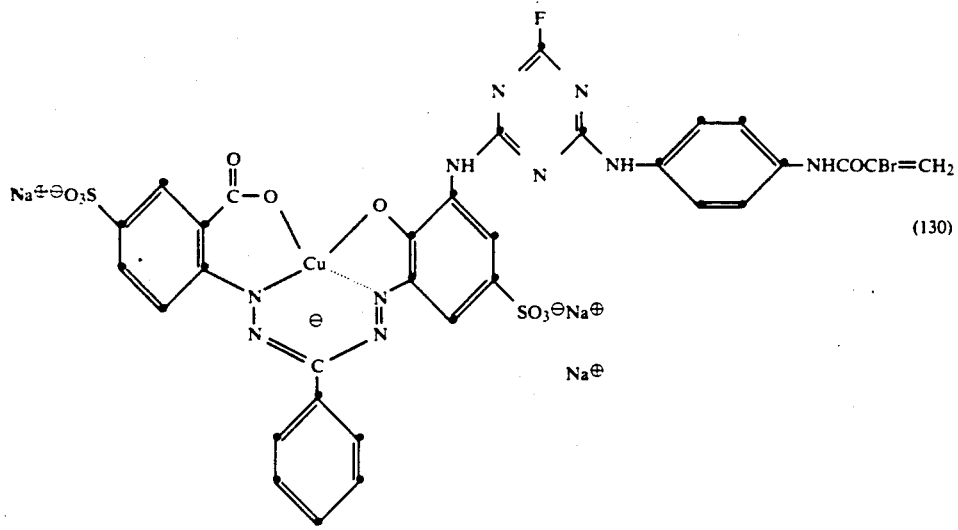 (130) | blue |

TABLE 4-continued
| Ex. | Dye | Hue on wool |
|---|---|---|
| 33 | 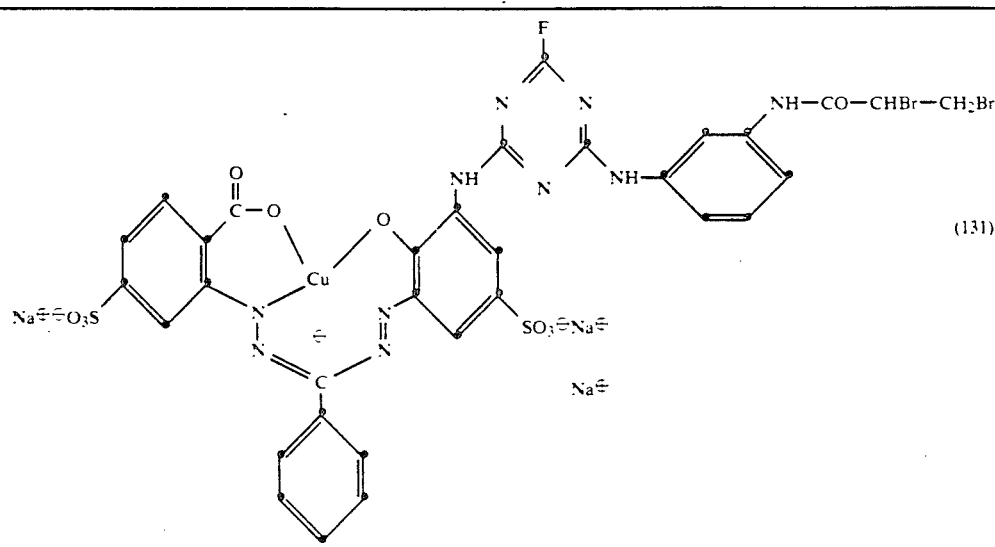 (131) | blue |
| 34 | 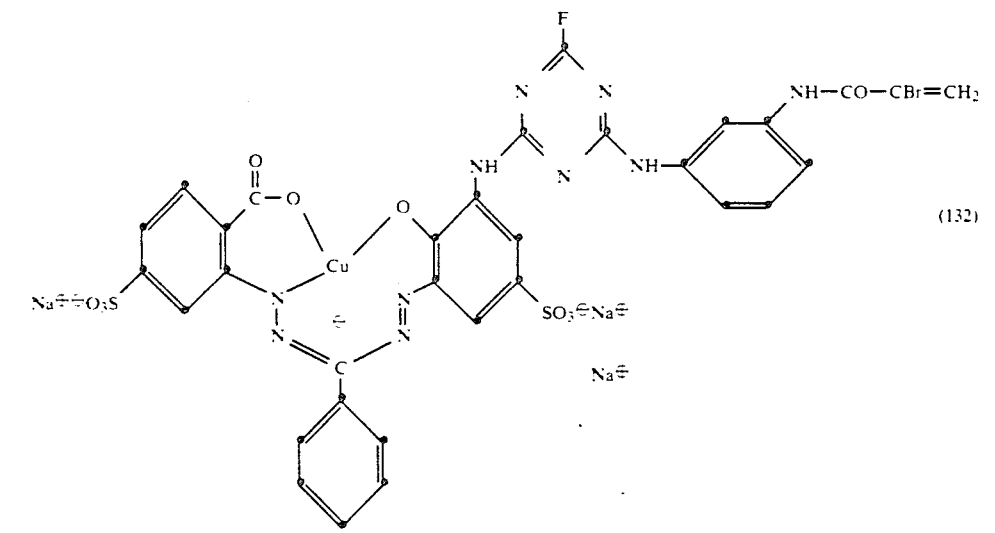 (132) | blue |
| 35 | 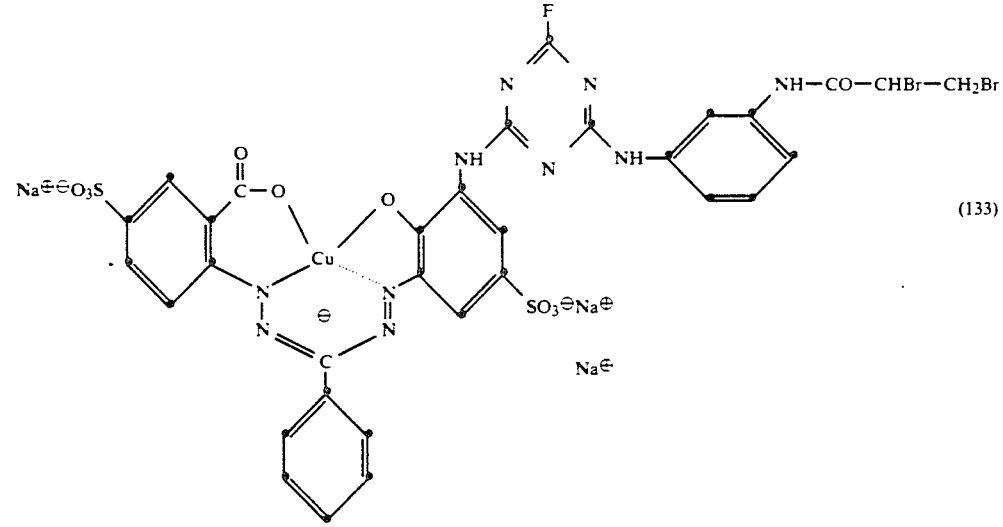 (133) | blue |

TABLE 4-continued

| Ex | Dye | Hue on wool |
|---|---|---|
| 36 | 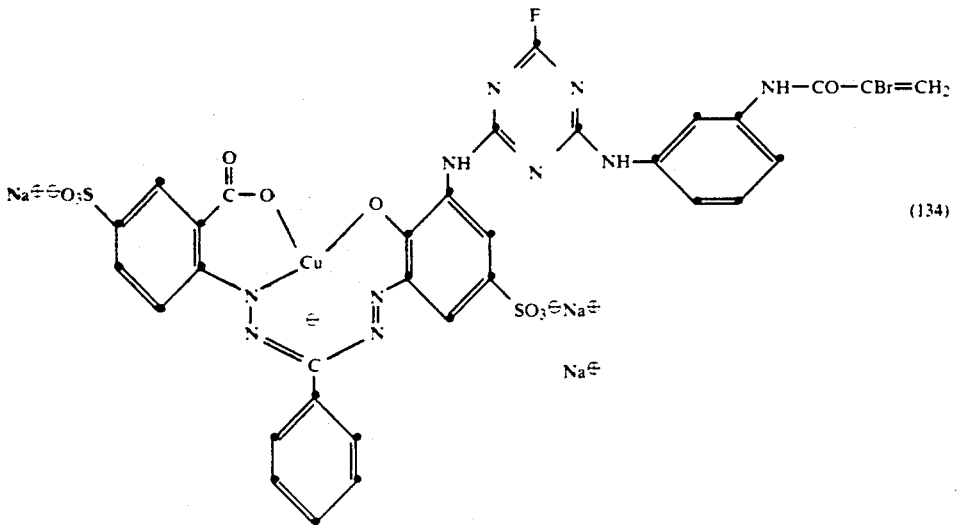 (134) | blue |

EXAMPLE 37

To a suspension of 3.22 parts of 4'-amino-2,3-dibromopropionylanilide in 25 parts of water is added dropwise a solution of 2.02 parts of cyanuric chloride in 30 parts of acetone at 0°–2° and a pH of 6–6.5. After the reaction has ended, a solution of 6 parts of the dye of the formula (104) in 50 parts of water (brought to pH 7 with hydrochloric acid) is added at 5° in the course of 15 minutes, during which the pH is maintained at a constant 6.25 with sodium chloride solution. After stirring overnight at room temperature, sodium chloride is added. The dye is filtered off with suction, washed with sodium chloride and dried at 60°–70°. 10.8 parts are obtained of the dye of the formula (105).

EXAMPLES 38 TO 44

Example 37 is repeated, except that the 4'-amino-2,3-dibromopropionylanilide is replaced by an equimolar amount of 3'-amino-2,3-dibromopropionylanilide or 4'-amino-2-bromoacryloylanilide or 3'-amino-2-bromoacryloylanilide together with a dye of the formula (104) or an equimolar amount of the dye of the formula (101), affording the corresponding dyes of the formulae (102), (103), (106), (107), (108), (109) and (110).

EXAMPLES 45 TO 52

The procedure of Examples 1, 3, 5, 7, 29, 31, 33 and 35 is repeated, except that the 3'- or 4'-amino-2,3-dibromopropionylanilide is replaced by an equimolar amount of 3'- or 4'-aminochloroacetanilide, affording the dyes indicated in column 2 of Table 5 which dye wool in the shades indicated in column 3.

TABLE 5
| Ex | Dye | Hue on wool |
|---|---|---|
| 45 | 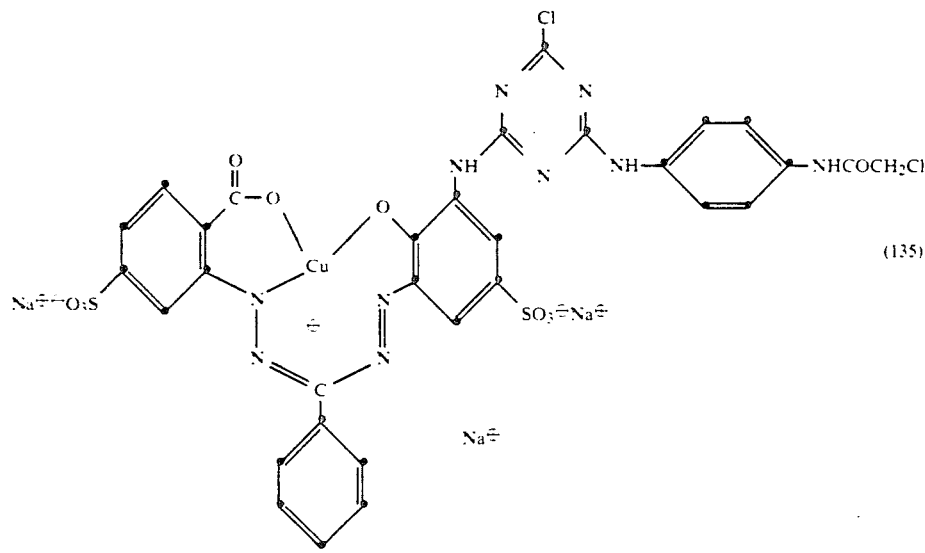 (135) | blue |
| 46 | 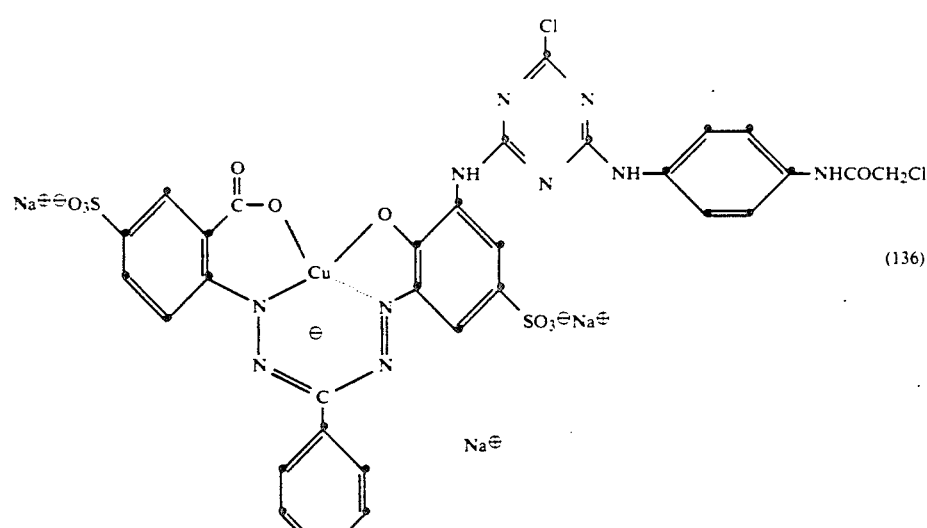 (136) | blue |

TABLE 5-continued

| Ex. | Dye | Hue on wool |
|---|---|---|
| 47 | (137) | blue |
| 48 | (138) | blue |

TABLE 5-continued
| Ex. | Dye | Hue on wool |
|---|---|---|
| 49 | 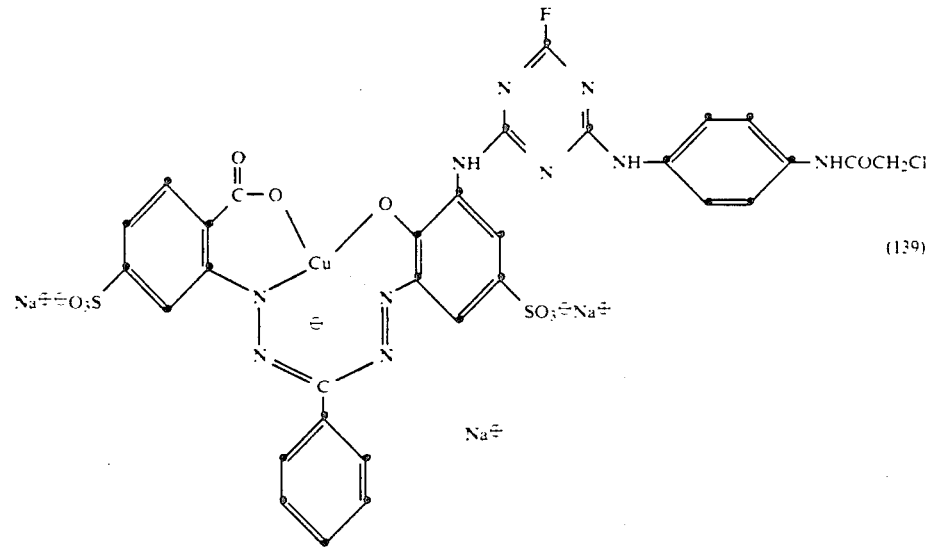 (139) | blue |
| 50 | 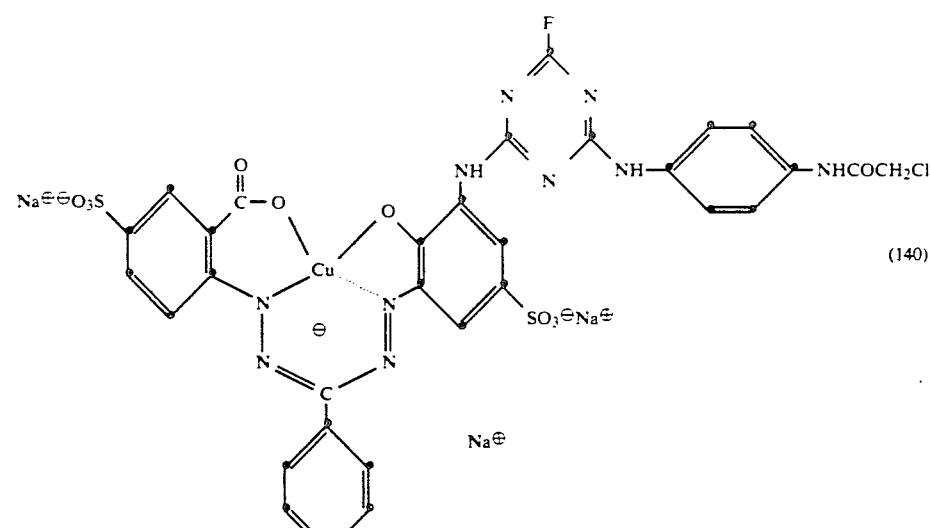 (140) | blue |

| Ex. | Dye | Hue on wool |
|---|---|---|
| 51 | 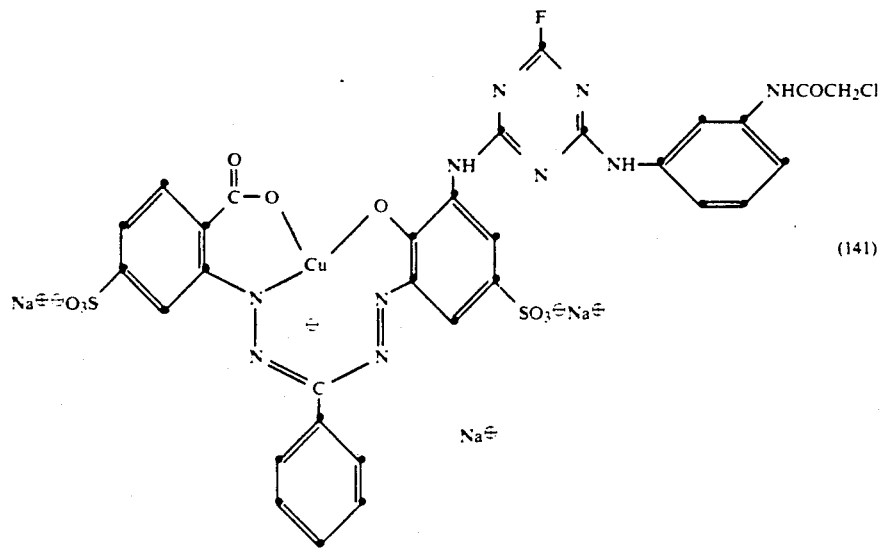 (141) | blue |
| 52 | 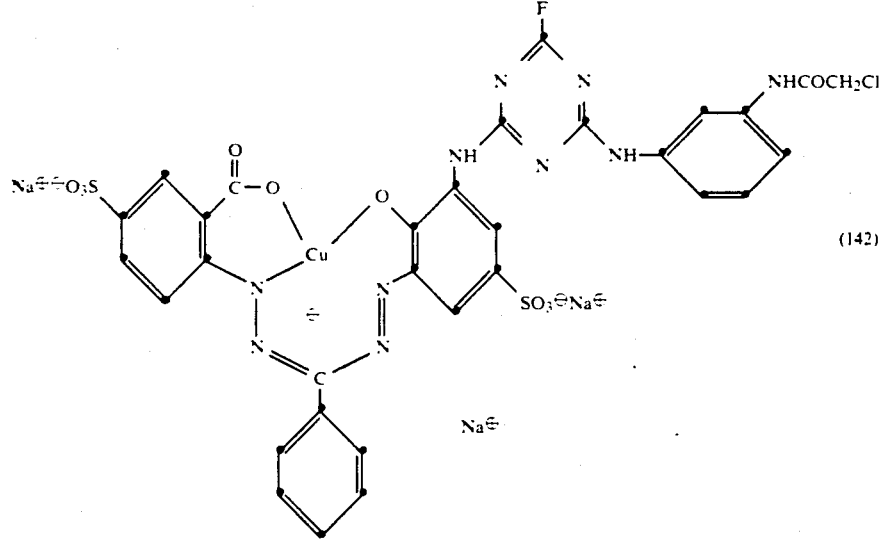 (142) | blue |
EXAMPLES 53 TO 56
The procedure of Examples 9, 10, 13 and 14 is repeated, except that the 3- or 4-(2′,3′-dibromopropionamido)benzenesulfonyl chloride is replaced by an equimolar amount of 3- or 4-chloroacetamidobenzenesulfonyl chloride, affording the dyes indicated in column 2 of Table 6 which dye wool in the shades indicated in column 3.

TABLE 6
| Ex | Dye | Hue on wool |
|---|---|---|
| 53 | 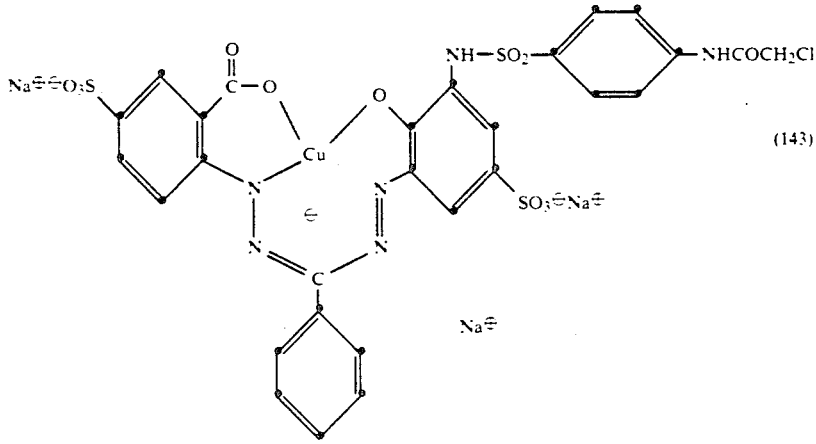 (143) | blue |
| 54 | 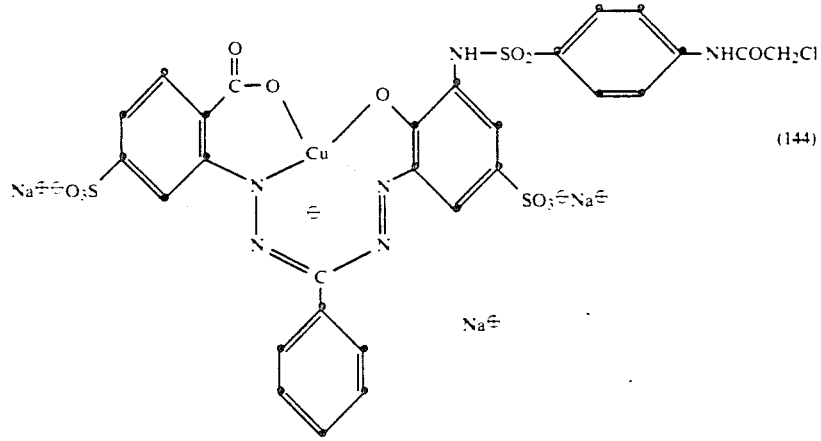 (144) | blue |
| 55 | 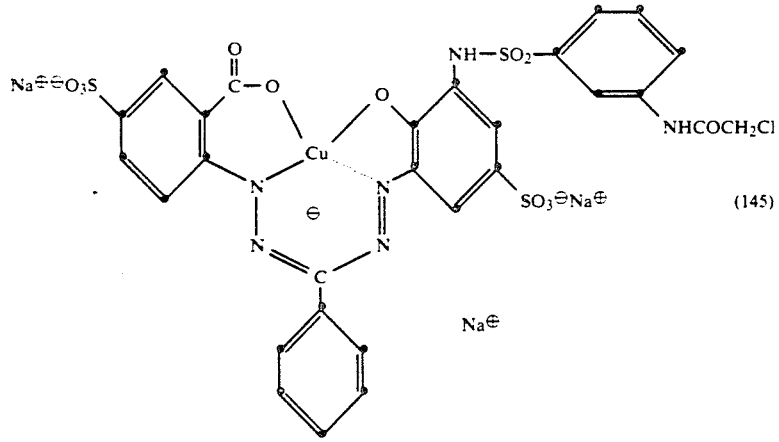 (145) | blue |

TABLE 6-continued

| Ex. | Dye | Hue on wool |
|---|---|---|
| 56 | 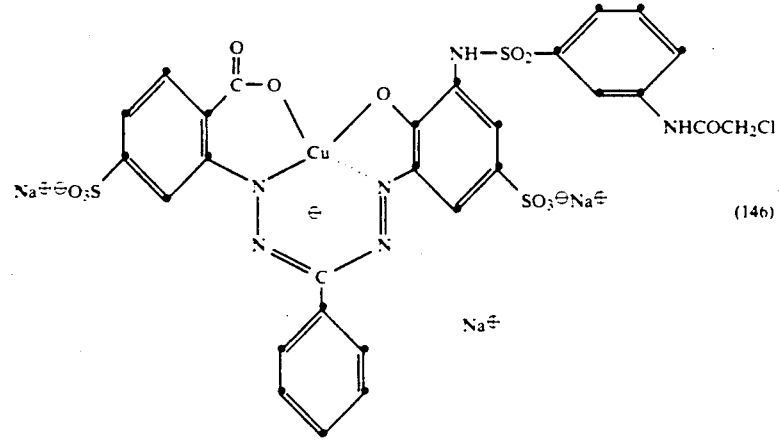 (146) | blue |

EXAMPLES 57 TO 60

The procedure of Examples 17, 18, 21 and 22 is repeated, except that the 3- or 4-(2',3'-dibromopropionamido)benzoyl chloride is replaced by an equimolar amount of 3- or 4-chloroacetamidobenzoyl chloride, affording the dyes indicated in column 2 of Table 7 below, which dye wool in the shades indicated in column 3.

TABLE 7

| Ex. | Dye | Hue on wool |
|---|---|---|
| 57 | 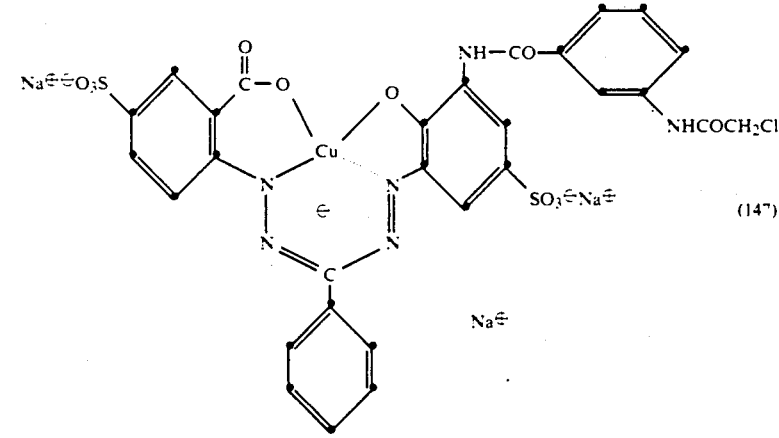 (147) | blue |
| 58 | 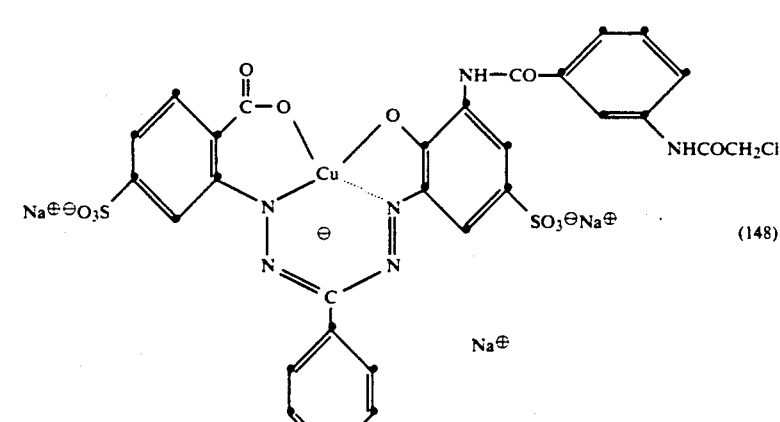 (148) | blue |

TABLE 7-continued

| Ex | Dye | Hue on wool |
|---|---|---|
| 59 | (chemical structure) (149) | blue |
| 60 | (chemical structure) (150) | blue |

EXAMPLE 61

6.62 parts of the dye of the formula (104) are dissolved in 50 parts of water at pH 7 by adding hydrochloric acid. A suspension of 2.9 parts of 4-acetamidobenzenesulfonyl chloride in 40 parts of acetone is then added dropwise at room temperature in the course of 10 minutes, during which the pH is maintained at a constant 7. Stirring overnight is followed by clarification, and the filtrate is brought to 13.5 with sodium hydroxide solution and refluxed for one hour. It is then clarified at room temperature, brought to a pH of 7–8 with hydrochloric acid and sodium chloride is added to it. The dye is filtered off with suction and washed with sodium chloride solution. The moist dye paste is dissolved in 200 parts of water, and 0.84 part of sodium bicarbonate is added. This is followed by the rapid dropwise addition of 2.76 parts of 2,3-dibromopropionyl chloride at pH 7. After stirring overnight at pH 7, sodium chloride is added, and the dye is filtered off, washed with sodium chloride solution and dried at 60°–70°. 8.7 parts are obtained of the dye of the formula (111).

EXAMPLES 62 TO 68

Example 61 is repeated, except that the 4-acetamidobenzenesulfonyl chloride is replaced by an equimolar amount of 3-acetamidobenzenesulfonyl chloride or 4-acetamidobenzoyl chloride or 3-acetamidobenzoyl chloride together with the dye of the formula (104) or by an equimolar amount of the formula (101), affording dyes of the formulae (112), (115), (116), (119), (120), (123) and (124).

EXAMPLES 69 TO 76

The procedure of Examples 61 to 68 is repeated, except that the 2,3-dibromopropionyl chloride is replaced by an equimolar amount of chloroacetyl chloride, affording the dyes of the formulae (143), (144), (145), (146), (147), (148), (149) and (150).

EXAMPLES 77 TO 93

The procedure of Examples 1, 2, 5, 6, 10, 12, 16, 18, 22, 24, 30, 33, 34, 55 or 60 is repeated, except that the amine of the formula (101) is replaced by an equimolar amount of one of the amines indicated in column 2 of Table 8, affording the dyes indicated in column 3, which dye wool in the shades indicated in column 4.

TABLE 8
| Ex. | Amine | Dye | Hue on wool |
|---|---|---|---|
| 77 | 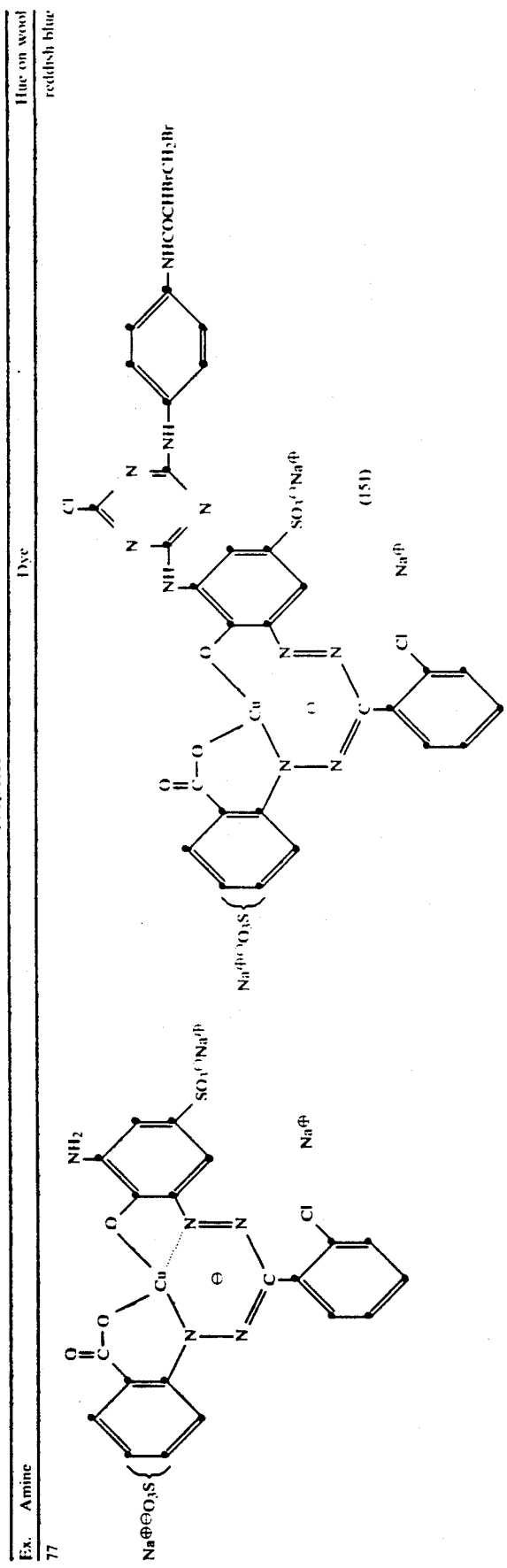 | | reddish blue |
| 78 | 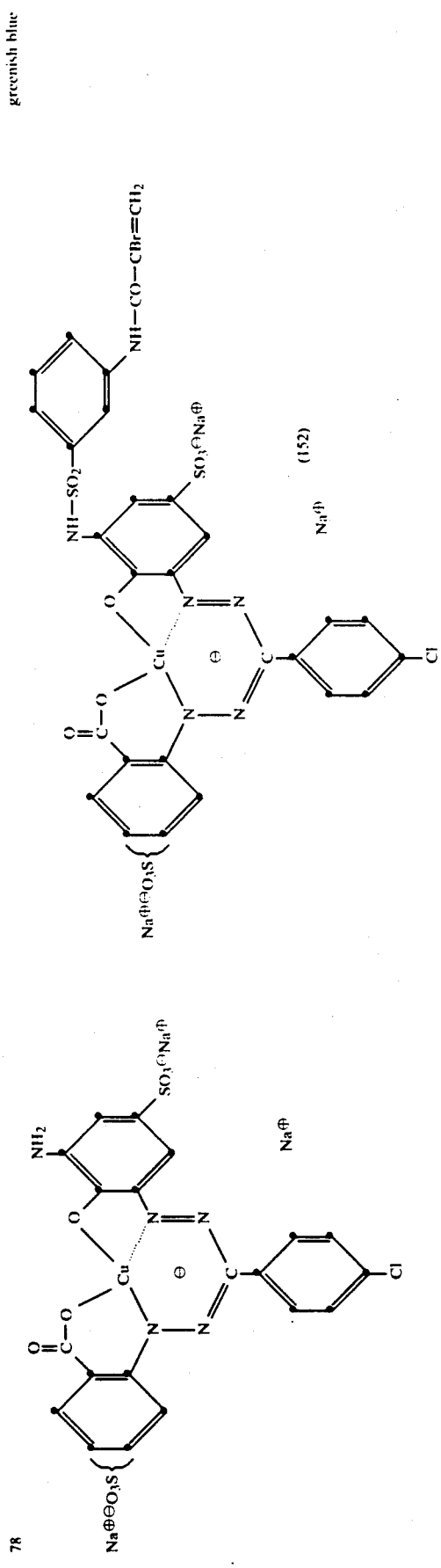 | | greenish blue |
| 79 | | | reddish blue |

TABLE 8-continued

| Ex. | Amine | Dye | Hue on wool |
|---|---|---|---|
| 80 | (structure) | (153) | greenish blue |
| 81 | (structure) | (154) | greenish blue |

TABLE 8-continued

| Ex. | Amine | Dye | Hue on wool |
|---|---|---|---|
| 82 | (structure) | (155) | blue |
| 83 | (structure) | (156) | blue |

TABLE 8-continued
| Ex. | Amine | Dye | Hue on wool |
|---|---|---|---|
| 83 | 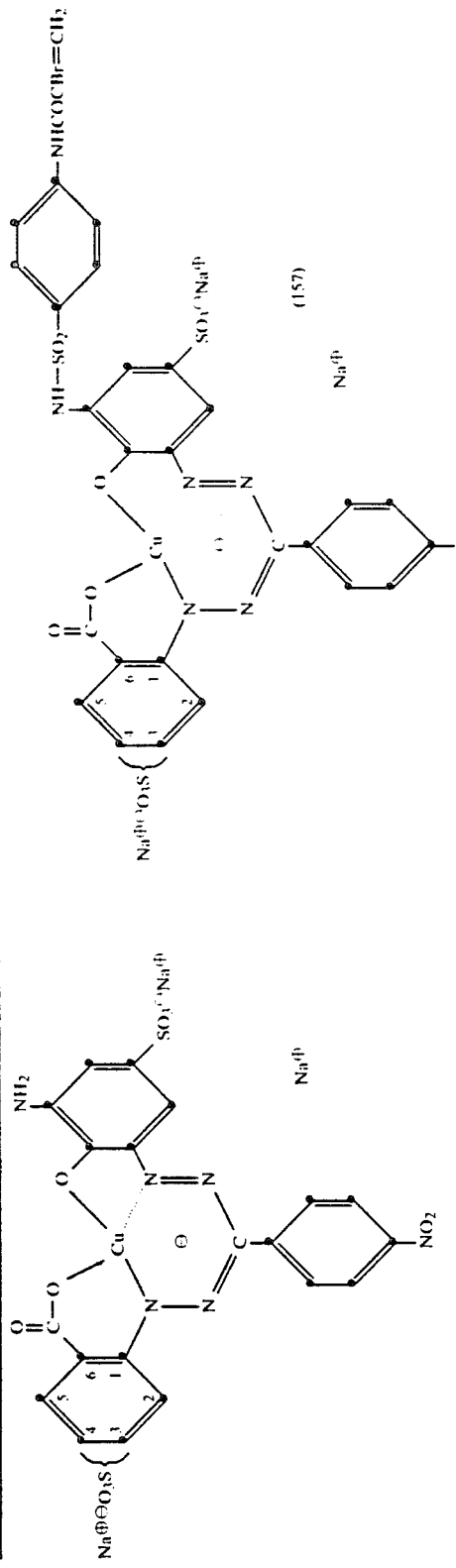 | 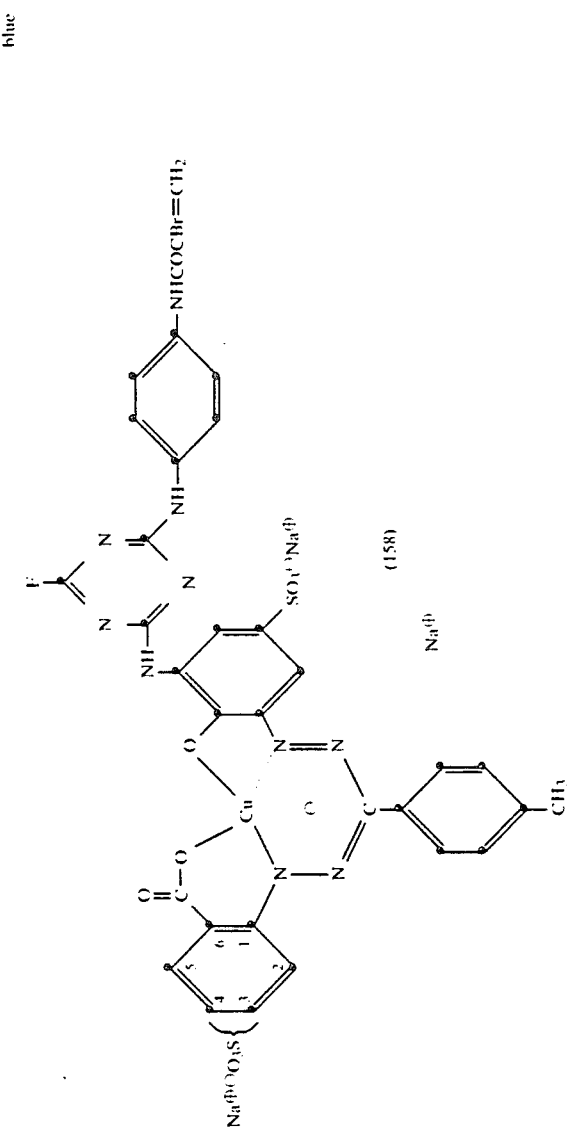 | blue |
| 84 | 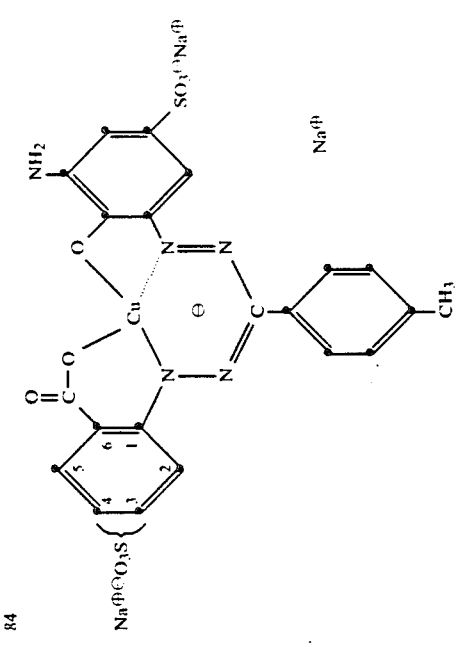 | | |

TABLE 8-continued

| Ex. | Amine | Dye | Hue on wool |
|---|---|---|---|
| 85 | | (structure) | blue |
| 86 | | (159) | blue |
| 87 | | (160) | blue |

TABLE 8-continued

| Ex. | Amine | Dye | Hue on wool |
|---|---|---|---|
| | | (161) | |
| 90 | | (164) | blue |

TABLE 8-continued

| Ex. | Amine | Dye | Hue on wool |
|---|---|---|---|
| 91 | (structure with Cu complex, NH2, SO3⊖Na⊕, Na⊕⊖O3S, OC2H5) | (165) (structure with Cu complex, NHCOCHBrCH2Br, SO3⊖Na⊕, Na⊕, Na⊕⊖O3S, OC2H5) | blue |
| 92 | (structure with Cu complex, NH2, SO3⊖Na⊕, Na⊕⊖O3S, F) | (166) (structure with Cu complex, NHCOCHBrCH2Br, SO3⊖Na⊕, Na⊕, Na⊕⊖O3S, F) | blue |

TABLE 8-continued

| Ex. | Amine | Dye | Hue on wool |
|---|---|---|---|
| 93 | [structure with Cu complex, SO₃⁻Na⁺, NH₂ groups] | (167) [structure with Cu complex, SO₃⁻Na⁺, triazine with Cl, NHCOCHBrCH₂Br] | greenish blue |

DYEING EXAMPLE 1

4 parts of 80% acetic acid, 2 parts of the ammonium salt of the acid sulfuric ester of the adduct of a fatty amine (consisting of 30% hexadecylamine, 25% octadecylamine and 45% octadecenylamine and 7 mole equivalents of ethylene oxide) and also 4 parts of ammonium sulfate are dissolved in succession in 4,000 parts of water at 50°.

5 parts of the dye of the formula (103) obtained as described in Example 2 are dissolved in 100 parts of hot water, and the solution is added to the above dyebath. 100 parts of prewetted wool knitting yarn are then introduced, and the temperature of the bath is raised from 50° to 80° in the course of 30 minutes. After 20 minutes of dyeing at 80°, the temperature is raised to the boil, and dyeing is continued at the boil for 90 minutes. Almost all the dye goes on the substrate. After the bath has been cooled at 80°, the pH is increased from about 4.5 to a permanent 8.5 by adding ammonia solution, and the dyed material is aftertreated at that temperature for 20 minutes. Thorough rinsing with hot and cold water, acidification with 1 part of 80% formic acid, centrifuging and drying leaves a dark blue wool yarn having very good wet and rub fastness properties and an excellent light fastness.

DYEING EXAMPLE 2

A wool fabric with an antifelting finish is impregnated with the preparation described hereinafter and is squeezed off on a pad-mangle to a wet pick-up of 250%:

| | |
|---|---|
| 4 | parts of Diaprint REG ® (acid-resistant thickener) |
| 1 | part of sulfamic acid |
| 0.2 | part of thymol |
| 0.2 | part of emulsifier |
| 94.6 | parts of water |
| 100 | parts. |

In a hot press the impregnated material is then contacted for 3 minutes at 100° to 105° under a pressure of about 0.5 kg/cm² with a transfer paper bearing a print pattern applied in a conventional manner with the dye of Example 3. After the wool fabric has been rinsed and dried it shows a corresponding blue print pattern having very good fastness properties.

DYEING EXAMPLE 3

A flannel fabric in chlorinated wool is impregnated on a padder mangle with the dye preparation described hereinafter and squeezed off to a wet pick-up of 100%:

| | |
|---|---|
| 50 | parts of the dye of Example 8 |
| 300 | parts of urea |
| 320 | parts of Solvitose OFA ® at 4% (thickener) |
| 10 | parts of a mixture of anionic fatty alcohol ether sulfate with nonionic wetting agents |
| 10 | parts of the levelling agent used in Dyeing Example 1 |
| 10 | parts of sodium metabisulfite |
| 10 | parts of 80% acetic acid |
| 290 | parts of water |
| 1000 | parts of padding liquor. |

The impregnated fabric is then rolled up and packed airtight and left in that state at room temperature for 48 hours. After rinsing with cold water the material is treated in a fresh bath with sufficient 24% ammonia as to give a pH of 8.5 and is maintained at 80° for 15 minutes. After rinsing in hot water it is finally soured off with 80% acetic acid and dried. The wool fabric shows a full blue shade having excellent fastness properties.

DYEING EXAMPLE 4

A flannel fabric of chlorinated wool is impregnated on a pad-mangle with the dye preparation described hereinafter and squeezed off to a liquor pick-up of 100%:

| | |
|---|---|
| 50 | parts of the dye of Example 1 |
| 300 | parts of Solvitose OFA ® at 40% (thickener) |
| 20 | parts of a mixture of anionic fatty alcohol ether sulfate with nonionic wetting agents |
| 10 | parts of the levelling agent used in Dyeing Example 1 |
| 20 | parts of 80% acetic acid |
| 600 | parts of water |
| 1000 | parts of padding liquor. |

The impregnated fabric is then introduced into a steamer and treated with saturated steam for 20 to 40 minutes. After rinsing with cold water, the material is treated in a fresh bath with sufficient 24% ammonia solution as to give a pH of 8.5 and is maintained at 80° for 15 minutes. After rinsing with hot water it is finally soured off with 80% of acetic acid and dried. The wool fabric shows a full blue shade having excellent fastness properties.

DYEING EXAMPLE 5

4 parts of 80% acetic acid, 2 parts of the ammonium salt of the acid sulfuric ester of the adduct of a fatty amine (consisting of 30% hexadecylamine, 25% octadecylamine and 45% octadecenylamine and 7 moles of ethylene oxide), and also 4 parts of ammonium sulfate are dissolved in succession in 1,000 parts of water at 50°.

3 parts of the dye obtained as described in Example 18 are dissolved in 100 parts of hot water, and the solution is added to the above dyebath. A circulation dyeing machine is entered with 100 parts of prewetted slubbing in muff form and the temperature of the bath is raised from 50 to 97°-99° in the course of 30 minutes, and dyeing is continued at the boil for 90 minutes. Almost all the dye goes onto the substrate. After the bath has been cooled down to 80°, the pH is raised from about 4.5 to a permanent 8.5 by the addition of ammonia solution, and the dyed material aftertreated at that temperature. Thorough rinsing with hot and cold water, souring off with 1 part of 80% formic acid, centrifuging and drying leaves a dark blue material having very good wet fastness and excellent light fastness.

DYEING EXAMPLE 6

6 parts of 80% acetic acid, 3 parts of ammonium salt of the acid sulfuric ester of the adduct of a fatty amine (consisting of 30% hexadecylamine, 25% octadecylamine and 45% octadecenylamine and 7 moles of ethylene oxide) and also 6 parts of ammonium sulfate are dissolved in succession in 1,000 parts of water at 50°.

3 parts of the dye obtained as described in Example 2 are dissolved in 100 parts of hot water, and the solution is added to the above dyebath. A circulation dyeing machine is entered with 150 parts of prewetted loose wool, and the temperature of the liquor is raised from 50° to 97°-99° in the course of 30 minutes, and dyeing is then continued at the boil for 90 minutes. Almost all the dye goes onto the substrate. After the liquor has been cooled down to 80°, the pH is raised from about 4.5 to a permanent 8.5 with the addition of ammonia solution, and the dyed material is aftertreated at that temperature for 20 minutes. Thorough rinsing with hot and cold water, souring off with 1 part 80% formic acid, centrifuging and drying leaves a blue substrate which has been dyed level in the fibre and has good wet and rub fastness and excellent light fastness properties.

DYEING EXAMPLE 7

4 parts of 80% acetic acid, 2 parts of the ammonium salt of the acid sulfuric ester of the adduct of a fatty amine (consisting of 30% hexadecylamine, 25% octadecylamine and 45% octadecenylamine and 7 moles of ethylene oxide) and also 4 parts of ammonium sulfate are dissolved in succession in 4,000 parts of water at 50°.

0.25 part of the dye obtained as described in Example 9 and 0.30 part of the yellow dye of the formula

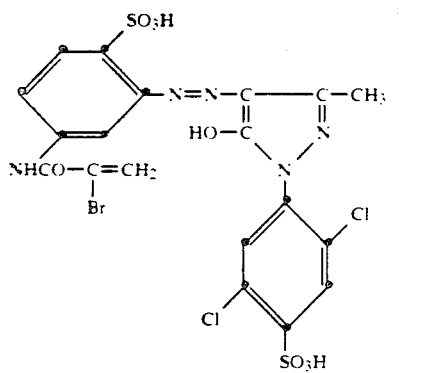

and 0.30 part of the red dye of the formula

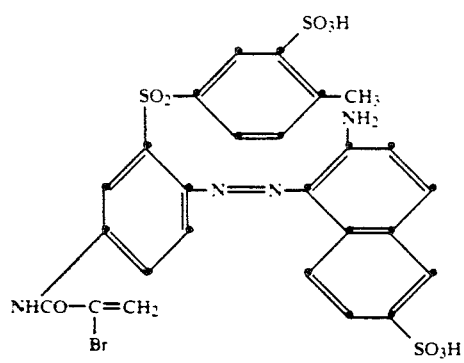

are dissolved in 100 parts of hot water, and the solution is added to the above dyebath. 100 parts of prewetted wool fabric are then introduced, and the temperature of the bath is raised from 50° to 80° in the course of 30 minutes. After 20 minutes of dyeing at 80°, the temperature is raised to the boil, and dyeing is then continued at the boil for 90 minutes. Almost all the dye goes onto the substrate. After the bath has been cooled down to 80°, the pH is raised from about 4.5 to a permanent 8.5 with the addition of ammonia solution, and the dyed material is aftertreated at that temperature for 20 minutes. Thorough rinsing with hot and cold water, souring off with 1 part of 80% formic acid, centrifuging and drying leaves a dark brown wool fabric which has been dyed level in the fibre and has very good wet and rub fastness and excellent light fastness properties.

DYEING EXAMPLE 8

4 parts of 80% acetic acid, 2 parts of the ammonium salt of the acid sulfuric ester of the adduct of a fatty amine (consisting of 30% hexadecylamine, 25% octadecylamine and 45% octadecenylamine and 7 moles of ethylene oxide) and also 4 parts ammonium sulfate are dissolved in succession in 1,000 parts of water at 50°.

0.6 part of the dye obtained as described in Example 2, 0.09 part of the yellow dye of the formula

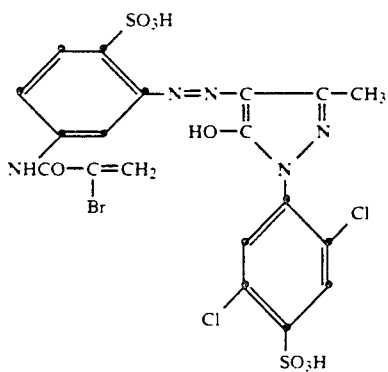

and 0.2 part of the red dye of the formula

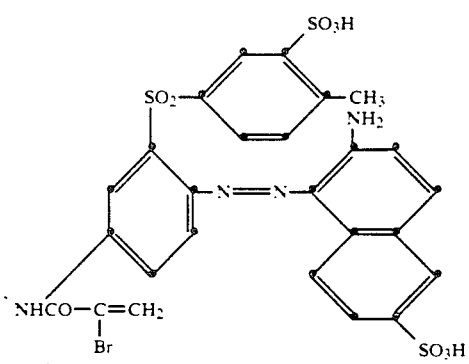

are dissolved in 100 parts of hot water, and the solution is added to the above dyebath. A circulation dyeing machine is entered with 100 parts of prewetted slubbing in muff form, and the temperature of the bath is raised from 50° to 97°-99° in the course of 30 minutes, and dyeing is then continued at the boil for 90 minutes. Almost all the dye goes onto the substrate. After the bath has been cooled down to 80°, the pH is raised from about 4.5 to a permanent 8.5 with the addition of ammonia solution, and the dyed material is aftertreated at that temperature for 20 minutes. Thorough rinsing with hot and cold water, souring off with 1 part of 80% formic acid, centrifuging and drying leaves a grey material having very good wet fastness and excellent light fastness properties.

I claim:

1. A process for the trichromatic dyeing or printing of natural and synthetic polyamide materials with dye mixtures, which comprises using a fibre-reactive formazan dye of the formula

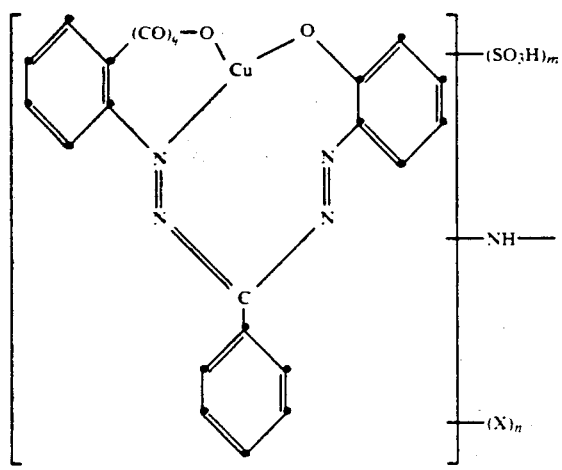

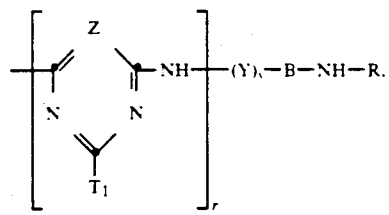

where B is an aliphatic or sulfo-free aromatic bridge member, R is α,β-dihalopropionyl, α-haloacryloyl or haloacetyl, $T_1$ is halogen, X is halogen, $C_1$-$C_4$alkyl, $C_1$-$C_4$alkoxy, cyano or nitro, Y is —CO— or —$SO_2$—, Z is nitrogen or —C—$T_2$, $T_2$ is halogen, hydrogen, $C_1$-$C_4$alkylthio, cyano, formyl or $C_1$-$C_4$alkylsulfonyl, m is 1, 2 or 3, n is 0, 1 or 2, q is 0 or 1, and r and s are each either 0 or 1 but never the same as each other, together with a fibre-reactive sulfo-containing red-dyeing azo dye and a fibre-reactive sulfo-containing yellow- or orange-dyeing azo dye.

2. A process according to claim 1, wherein the yellow- or orange- and red-dyeing dyes each contain as the fibre-reactive group a halotriazine or a halopyrimidine group or a α-β-dihalopropionyl or α-haloacryloyl.

3. A process according to claim 1, wherein the yellow- or orange- and red-dyeing dyes contain as the fibre-reactive group difluorochloropyrimidinyl, α-β-dihalopropionyl, or α-haloacryloyl.

4. The process according to claim 3, wherein the fibre-reactive group includes 2,4-difluoro-5-chloropyrimidinyl.

5. The process according to claim 3, wherein the fibre-reactive group includes α,β-dibromopropionyl.

6. The process according to claim 3, wherein the fibre-reactive group includes α-bromoacryloyl.

7. The process according to claim 1, wherein the polyamide material is wool.

* * * * *